US007775868B2

(12) United States Patent
Toyoda

(10) Patent No.: US 7,775,868 B2
(45) Date of Patent: Aug. 17, 2010

(54) GAMING MACHINE FOR PLAYING BACCARAT WITH MULTIPLE BET MODES DISPLAYED IN THE ALTERNATIVE AND WITH DIFFERENT BET LIMITS

(75) Inventor: Hirobumi Toyoda, Tokyo (JP)

(73) Assignee: Universal Entertainment Corporation, Koto-ku, Tokyo (JP)

( * ) Notice: Subject to any disclaimer, the term of this patent is extended or adjusted under 35 U.S.C. 154(b) by 559 days.

(21) Appl. No.: 11/472,560

(22) Filed: Jun. 22, 2006

(65) Prior Publication Data

US 2007/0010320 A1 Jan. 11, 2007

(30) Foreign Application Priority Data

Jun. 23, 2005 (JP) ............................ 2005-183012

(51) Int. Cl.
*A63F 9/24* (2006.01)
*A63F 13/00* (2006.01)

(52) U.S. Cl. ............................ 463/12; 463/11; 463/13; 463/16

(58) Field of Classification Search ........... 463/16–201, 463/47, 1–13
See application file for complete search history.

(56) References Cited

U.S. PATENT DOCUMENTS 4,805,907 A 2/1989 Hagiwara
5,395,119 A * 3/1995 Jacob et al. ................. 273/274
6,164,651 A * 12/2000 Webb ......................... 273/274
6,328,306 B1 * 12/2001 Webb ......................... 273/274
6,733,012 B2 * 5/2004 Bui et al. .................... 273/292
6,837,494 B2 * 1/2005 Lee ............................ 273/292
6,916,245 B1 * 7/2005 Vancura et al. ............... 463/26
7,309,065 B2 * 12/2007 Yoseloff et al. ............... 463/13

(Continued)

FOREIGN PATENT DOCUMENTS

CN 1939563 A 4/2007

(Continued)

OTHER PUBLICATIONS

Eurasian Search Report Dated Oct. 23, 2006.
Macao Office Action dated Feb. 14, 2008 with English Translation.

*Primary Examiner*—Peter DungBa Vo
*Assistant Examiner*—David Duffy
(74) *Attorney, Agent, or Firm*—McGinn IP Law Group, PLLC

(57) ABSTRACT

A gaming machine has a mode information storage section in which first bet mode information corresponding to an normal bet mode and second bet mode information corresponding to a score bet mode are stored, and a terminal-side game control section for running a game on the basis of one, selected by a player, of the first bet mode information and the second bet mode information. Each of the first bet mode information and the second bet mode information is information including plural bet subjects, bet factors for the respective bet subjects, a lower limit bet amount, and an upper limit bet amount. The lower limit bet amount of the first bet mode information is larger than that of the second bet mode information. The maximum value of the bet factors of the first bet mode information is smaller than that of the bet factors of the second bet mode information.

13 Claims, 19 Drawing Sheets

U.S. PATENT DOCUMENTS

| | | | | |
|---|---|---|---|---|
| 7,419,160 | B1 * | 9/2008 | D'Ambrosio | 463/12 |
| 2003/0054870 | A1 * | 3/2003 | Sato et al. | 463/6 |
| 2003/0064781 | A1 | 4/2003 | Muir | |
| 2003/0190962 | A1 | 10/2003 | Canterbury | |
| 2003/0216162 | A1 | 11/2003 | Vancura | |
| 2005/0070351 | A1 | 3/2005 | Reeves | |

FOREIGN PATENT DOCUMENTS

| | | |
|---|---|---|
| JP | 2003-220169 | 8/2003 |
| JP | 2005-006862 | 1/2005 |
| RU | 2 239 231 C2 | 10/2004 |

* cited by examiner

FIG. 10A

| BET SUBJECT | BET FACTOR | LOWER LIMIT BET AMOUNT | UPPER LIMIT BET AMOUNT |
|---|---|---|---|
| TIE | 9 | 50 | 1000 |
| BANKER | 1.95 | | |
| PLAYER | 2 | | |

FIG. 10B

| BET SUBJECT | | BET FACTOR | LOWER LIMIT BET AMOUNT | UPPER LIMIT BET AMOUNT |
|---|---|---|---|---|
| AREA | SCORE | | | |
| TIE | 0 TO 3 | 53.42 | 1 | 50 |
| TIE | 4 TO 6 | 26.76 | | |
| TIE | 7 TO 9 | 30.42 | | |
| BANKER | 0 TO 3 | 21.12 | | |
| BANKER | 4 TO 6 | 7.05 | | |
| BANKER | 7 TO 9 | 8.28 | | |
| PLAYER | 0 TO 3 | 27.12 | | |
| PLAYER | 4 TO 6 | 3.37 | | |
| PLAYER | 7 TO 9 | 3.12 | | |

GAMING MACHINE FOR PLAYING BACCARAT WITH MULTIPLE BET MODES DISPLAYED IN THE ALTERNATIVE AND WITH DIFFERENT BET LIMITS

CROSS-REFERENCE TO THE RELATED APPLICATION(S)

The present application is based upon and claims priority from prior Japanese Patent Application No. 2005-183012, filed on Jun. 23, 2005, the entire contents of which are incorporated herein by reference.

TECHNICAL FIELD

The present invention relates to a gaming machine. More specifically, the present invention relates to a gaming machine in which a player plays a game by betting a game medium.

BACKGROUND

Gaming machines that allow a player to play games that are used to play in casinos more easily as such by replacing a human dealer with a computer-generated graphics and by allowing the player to use game medium (medals, coins, or credits stored in a prepaid card) instead of real money, have spread in the market. And a gaming machine that enables playing of baccarat has been realized as one of those gaming machines (see JP-A-2003-220169). The gaming machine disclosed in the document JP-A-2003-220169 employs a function of showing a tendency of the previously played games to the player in an easy-to-understand manner using a graph or a table.

In the gaming machine as described above, a rule of the game including bet subjects such as “Tie,” “Player,” and “Banker” and the bet factors (coefficients by which a bet amount is multiplied to determine an award when the player wins the game) for the respective bet subjects, are the same as those of the conventional casino game. Therefore, the number of bet subjects is as small as three and the bet factors set for respective bet subjects do not become very large. Accordingly, the player of the gaming machine cannot expect a large amount of award.

One solution for solving the above problem is to employ a game rule in which the number of bet subjects and the bet factors set for the respective bet subjects are increased so that a larger amount of award is expected than in the conventional game rule.

In games such as a horse racing game in which the bet factors are variable, the probability of occurrence of an enormous payment is low even when a player bets a large bet amount (i.e., the bet factor of an easy-to-win bet subject is set small and that of a hard-to-win bet subject is set large). However, in games such as baccarat and roulette in which the bet factors are fixed, an enormous payment may occur when a player bets a large bet amount. Accordingly, management of the payout rate becomes more difficult and complicated.

SUMMARY

One of objects of the present invention is to provide a gaming machine capable of controlling a payout rate while allowing a player to expect a large amount of award in a case where a game based on a conventional game traditionally played such as baccarat or a conventional game that is played with a fixed bet factors.

According to one aspect of the invention, there is provided a gaming machine including: a controller that performs a game processing for providing a game to a player, the game being is performed by allowing the player to bet a game medium to a bet subject in one of first bet mode and a second bet mode being selected in accordance with a selection made by the player; and a storage unit that stores first bet mode information that is used by the controller in performing the game in the first bet mode, and second bet mode information that is used by the controller in performing the game in the second bet mode. Each of the first bet mode information and the second bet mode information includes information for specifying a plurality of bet subjects on which the player is allowed to bet, a plurality of bet factors for the respective bet subjects, the bet factors set to be multiplied with the game medium bet on the respective bet subjects when the player wins the game, and a lower limit bet amount and an upper limit bet amount that regulates an amount of game medium allowed to bet in the game. The lower limit bet amount of the first bet mode information is set to be larger than the lower limit bet amount of the second bet mode information. A maximum value of the bet factors of the first bet mode information is set to be smaller than a maximum value of the bet factors of the second bet mode information.

BRIEF DESCRIPTION OF THE DRAWINGS

In the accompanying drawings:

FIG. 10 shows exemplary data structures of pieces of bet mode information;

DETAILED DESCRIPTION

Referring now to the accompanying drawings, there is shown an embodiment of the present invention.

1. Appearance of Gaming Machine

Figure 1:
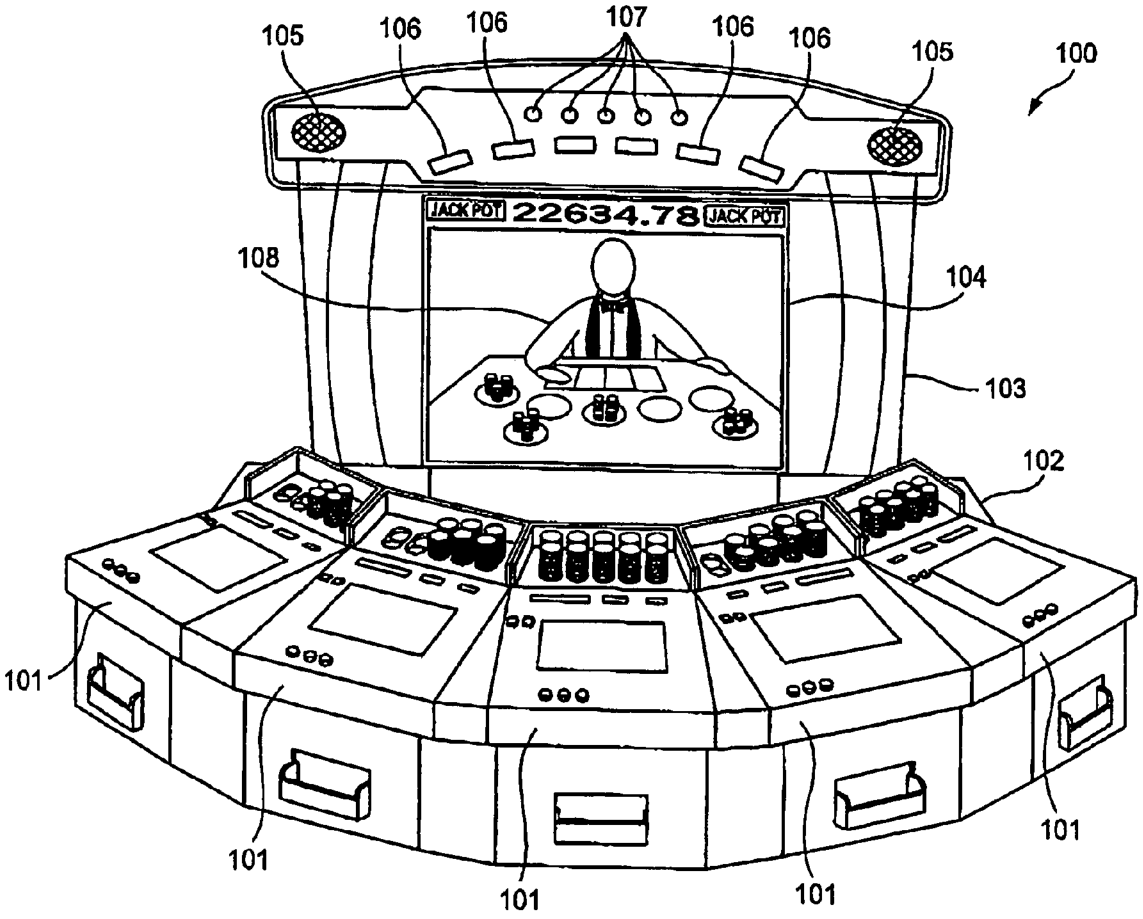
FIG. 1 is a perspective view showing an appearance of a gaming machine according to a embodiment.

FIG. 1 shows an appearance of a gaming machine according to the embodiment. As shown in FIG. 1, the gaming machine 100 has a table section 102 in which player terminals 101 called satellites are arranged approximately in fan-like form and a panel section 103 that is installed behind the table section 102. In the example of FIG. 1, five player terminals 101 are arranged in fan-like form around the panel section 103.

The panel section 103 has a front display 104 that includes: a display device such as a liquid crystal display device; speakers 105; lamps 106; and LEDs 107. The front display 104 informs all players who operates the respective player terminals 101 about information on the whole of a game the players join in. The front display 104 informs the players of the start of a bet-possible period, the end of betting, winners and losers of a game using an animation of a dealer 108.

Figure 2:
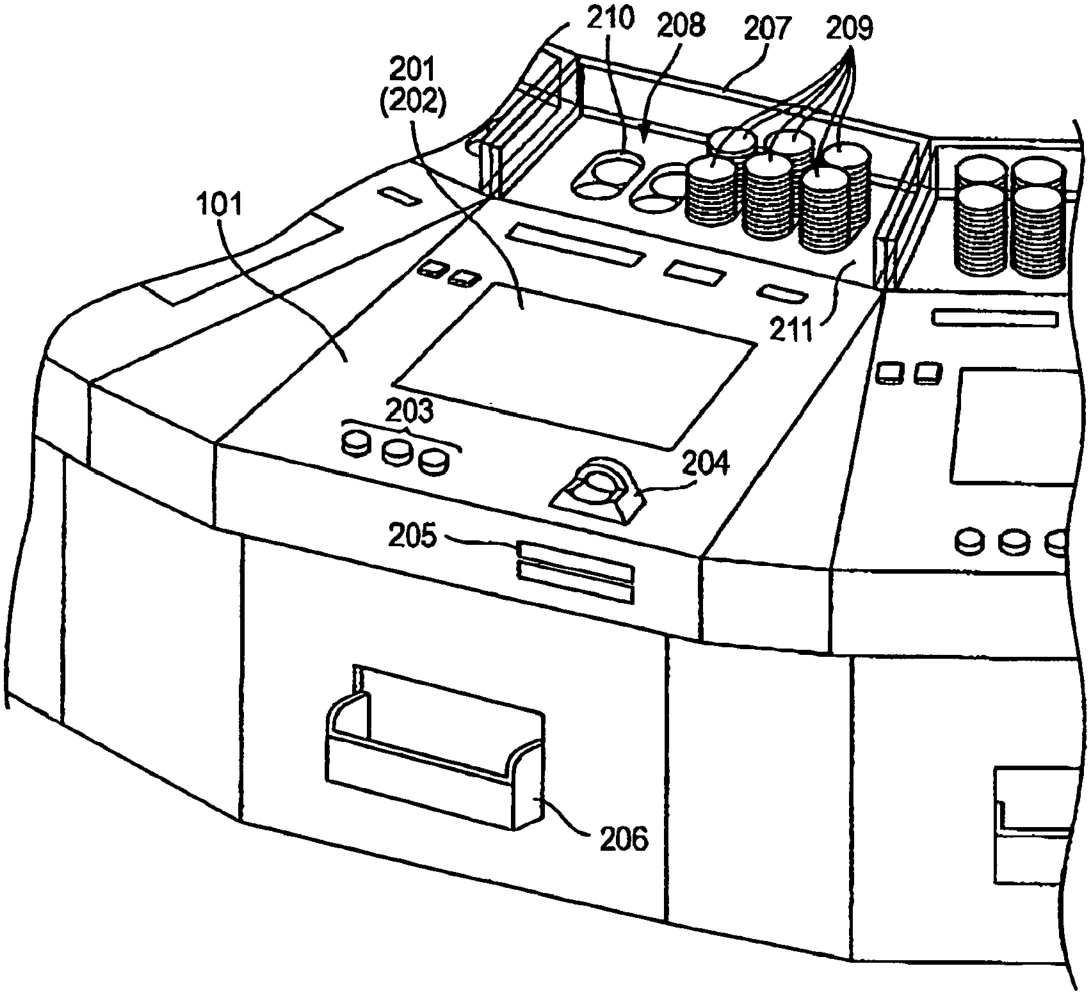
FIG. 2 is a perspective view of a player terminal.

FIG. 2 is an enlarged view of each player terminal 101. Each player terminal 101 will be described below with reference to FIG. 2. The player terminal 101 has, in the top surface, a liquid crystal display 201 for presenting information relating to a game to the player. The liquid crystal display 201 is covered with a transparent touch panel 202 and displays an input interface screen. A button group 203 consisting of plural buttons to be used by the player in playing a game, such as a PAYOUT button and a BET button, are disposed on the player side of the liquid crystal display 201. A coin insertion portion 204 through which the player inputs game medium media such as coins, medals, or chips (hereinafter simply referred to as "coins") is disposed on the right of the button group 203. A bill insertion portion 205 through which the player inputs bills is disposed below the coin insertion portion 204. The coin insertion portion 204 is equipped with a coin sensor (not shown). When a coin is input to the coin insertion portion 204, a coin detection signal is output from the coin sensor to the player terminal 101. The bill insertion portion 205 is equipped with a bill sensor (not shown). When a game medium such as a bill (paper money) or a game medium in a thin form such as a coupon and a prepaid card, is input to the bill insertion portion 205, a bill detection signal is output from the bill sensor to the player terminal 101.

The player terminal 101 is provided with a coin payout opening 206 on the front side at a low position. If the player presses the PAYOUT button which is one of the buttons of the button group 203, coins corresponding to all or part of a player-owned credit value that is stored in the player terminal 101 are ejected through the coin payout opening 206 and the player can acquire the paid-out coins.

A bracket-shaped transparent acrylic panel 207 is disposed behind (i.e., on the panel-section-103-side of) the liquid crystal display 201, and a solid model chips presenting section 208 is provided in an area that is surrounded by the transparent acrylic panel 207. The solid model chips presenting section 208 is composed of solid model chip stacks 209, a presenting section plate 211 that is formed with openings 210 through which the solid model chip stacks 209 project from inside to outside the player terminal 101 or retract so as to be placed inside the player terminal 101, and an elevation mechanism (described later) for elevating and lowering the solid model chip stacks 209.

Each solid model chip stack 209 is a model of a stack of chips and is a resin mold, for example. Each solid model chips presenting section 208 may have plural solid model chip stacks 209 of different units. For example, there may be prepared a solid model chip stack that simulates a stack of chips each being worth one credit unit, a solid model chip stack that simulates a stack of chips each being worth 10 credit units, a solid model chip stack that simulates a stack of chips each being worth 100 credit units, etc.

The solid model chip stacks 209 are elevated or lowered by an elevation mechanism in accordance with the number of chips credited to the gaming machine 100 by the player who manipulates the player terminal 101 that is provided with the solid model chip stacks 209, that is, a player-owned credit value. Now assume that the player-owned credit value is "251," for example. In this case, a solid model chip stack 209 that simulates a stack of chips each being worth one credit unit is elevated so as to project from the presenting section plate 211 by a length that is equal to the height of one chip, another solid model chip stack 209 that simulates a stack of chips each being worth 10 credit units is elevated so as to project from the presenting section plate 211 by a length that is equal to the height of five chips, and still another solid model chip stack 209 that simulates a stack of chips each being worth 100 credit units is elevated so as to project from the presenting section plate 211 by a length that is equal to the height of two chips.

Each player can recognize a player-owned credit value quickly and intuitively by visually checking the lengths of projection, from the presenting section plate 211, of solid model chip stacks 209. Furthermore, the player can feel as if actual chips were being added or removed right in front of him or her in an actual game.

Figure 3:
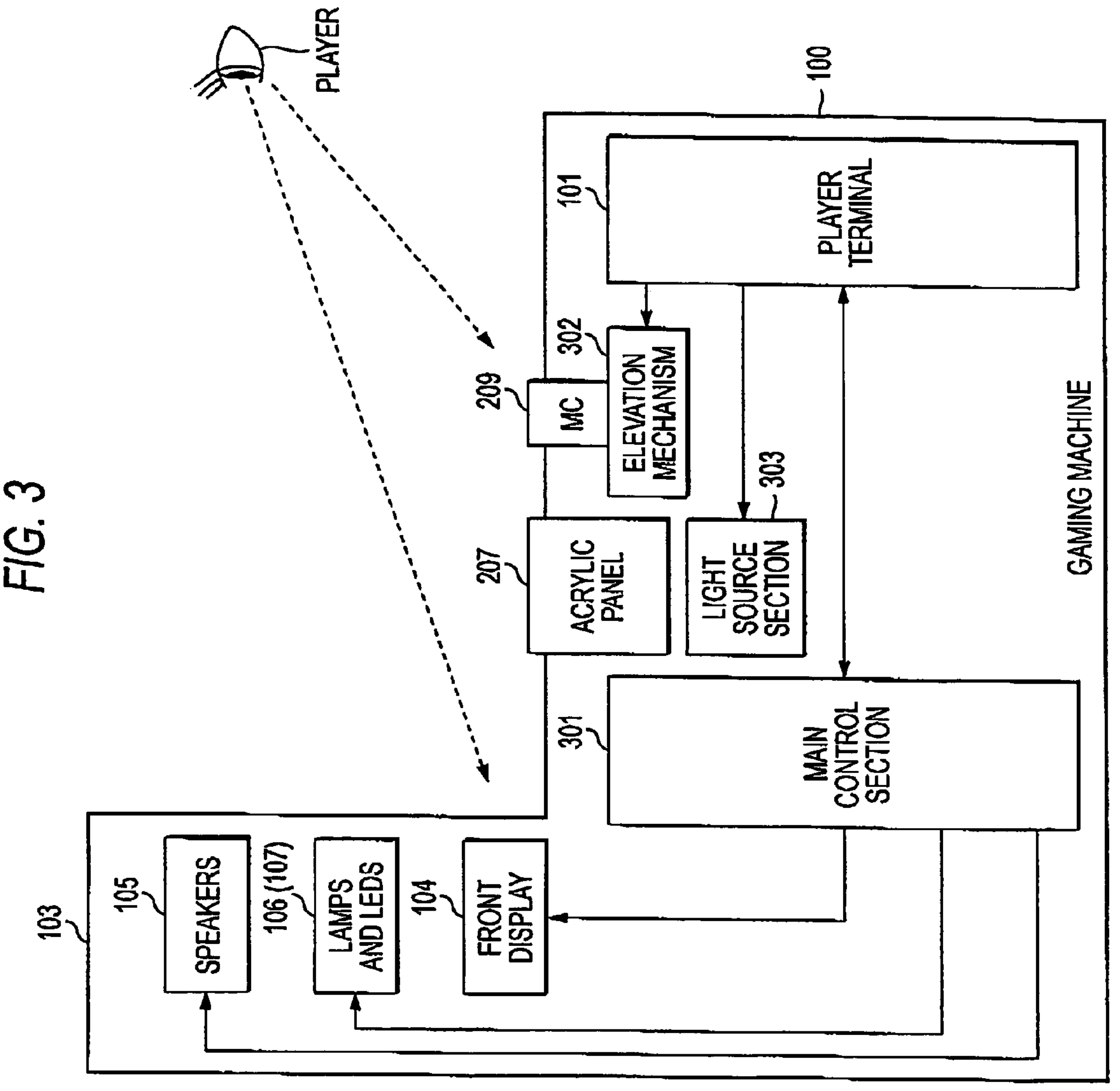
FIG. 3 is a block diagram of a control system of the gaming machine.

FIG. 3 is a schematic block diagram showing the internal configuration of the gaming machine 100. The gaming machine 100 incorporates a main control section 301, which is composed of an information processing apparatus which runs game programs and peripheral devices. The main control section 301 is connected to each player terminal 101 so as to be able to perform a bidirectional communication with it. The main control section 301 receives, from each player terminal 101, information indicating the number of coins bet, a bet subject, etc. selected by each player, starts a game when prescribed conditions have been satisfied, determines winners and losers of the game, and informs the player terminals 101 of the results. According to the information received from the main control section 301, each player terminal 101 increases or decreases the credit value owned by the player. For example, if the player wins the game, the player terminal 101 adds a credit value corresponding to the number of acquired coins to the owned credit value according to the information received from the main control section 301 and stores a resulting owned credit value. On the other hand, if the player loses the game, the player terminal 101 subtracts a credit value corresponding to the number of coins bet from the owned credit value according to the information received from the main control section 301 and stores a resulting owned credit value.

The main control section 301 also performs output of an image signal to be displayed on the front display 104, drive controls on the lamps 106 and the LEDs 107, and a drive control on the speakers 105.

An elevation mechanism 302 and a light source section 303 are connected to each of the player terminals 101.

The elevation mechanism 302 is a mechanism for elevating and lowering the solid model chip stacks 209. Although in this embodiment the elevation mechanism 302 employs a stepping motor as a source of elevation/lowering power, an ordinary motor or actuators may be used in combination with a position control mechanism.

A specific structure of the elevation mechanism 302 will be described below with reference to FIG. 4.

Figure 4:
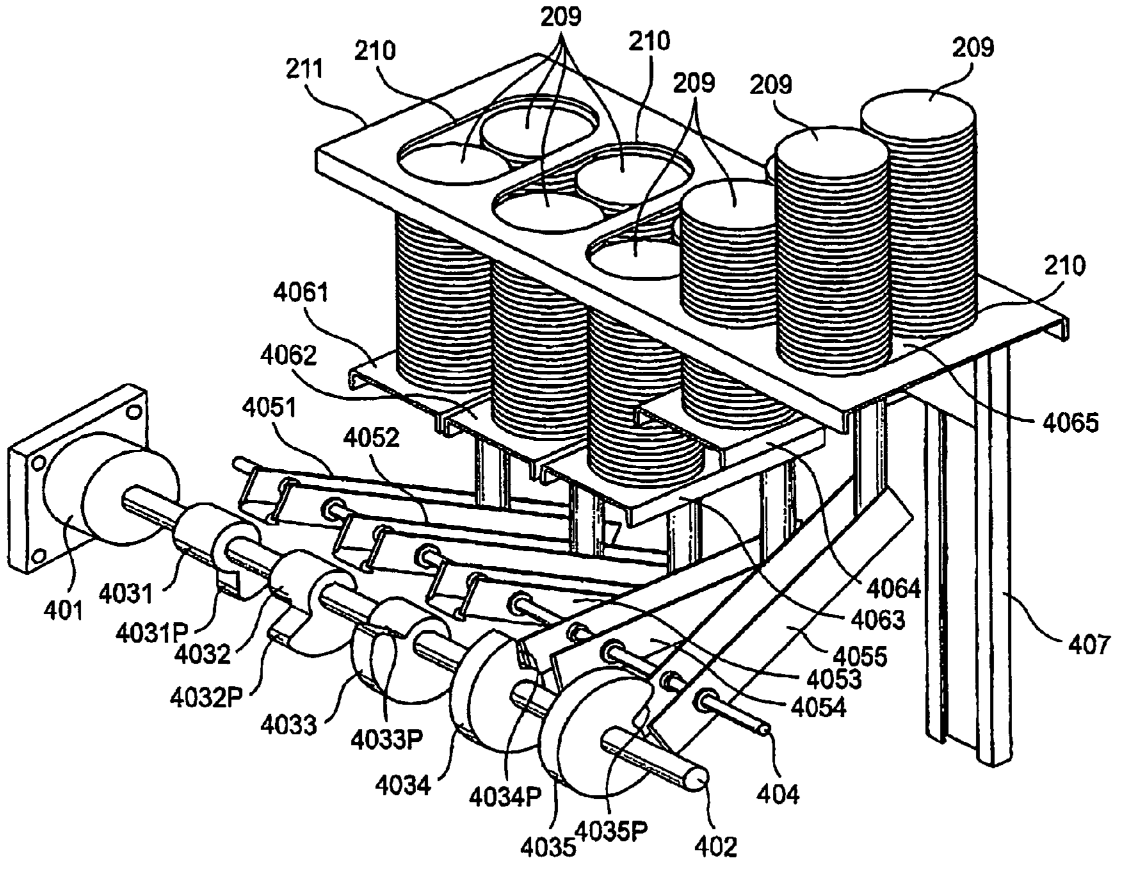
FIG. 4 is a perspective view of an example of an elevation mechanism.

The elevation mechanism 302 shown in FIG. 4 has a rotary drive shaft 402 which is attached to a stepping motor 401, contact members 4031-4035 which are fixed to the rotary drive shaft 402 and rotate as the rotary drive shaft 402 is rotated, arms 4051-4055 which are rotatably attached to a support shaft 404 in such a manner that their one ends can come into contact with contact surfaces 4031P-4035P of the contact members 4031-4035, and tables 4061-4065 which are attached to the other ends of the arms 4051-4055. The solid model chip stacks 209 are fixedly mounted on the top surfaces of the tables 4061-4065. Guided by the slide rails 407, the tables 4061-4065 are restricted in motion so that the solid model chip stacks 209 pass through the openings 210 correctly.

In the example of FIG. 4, five kinds of solid model chip stacks 209 are elevated and lowered. And the five contact members 4031-4035, the five contact surfaces 4031P-4035P, the five arms 4051-4055, and the five tables 4061-4065 are provided. Although the suffixes are used to discriminate between the five members or surfaces, if no such discrimination is necessary the suffixes will be omitted and notations "contact members 403," "contact surfaces 403P," "arms 405," and "tables 406" will be used.

Next, the operation of the elevation mechanism 302 shown in FIG. 4 will be described.

The contact members 403 rotate as the stepping motor 401 being driven by the player terminal 101 rotates the rotary drive shaft 402. As the rotation of the contact members 403 continues, the contact surfaces 403 come to contact the one ends of the arms 405. In this example, the contact surface 4035P contacts the one end of the arm 4055 earliest and then the contact surfaces 4034P, 4033P, 4032P, and 4031P contact the one ends of the arms 4054-4051 in this order.

When a contact surface 403P is rotated further after contacting the one end of the associated arm 405, the contact surface 403P pushes down the one end of the arm 405.

When the one end is pushed down, the arm 405 is rotated about the support shaft 404 and the other end is lifted up. As a result, the table 406 which is fixed to the other end of the arm 405 is also lifted up together with the solid model chip stack 209 mounted thereon. In this manner, all or part of the solid model chip stack 209 can pass through the opening 210 and project (appear) from the presenting section plate 211 in accordance with an angle of rotation, by the stepping motor 401, of the rotary drive shaft 402.

It is also possible to cause all or part of a projected (exposed) portion of a solid model chip stack 209 to retract so as to be placed under the presenting section plate 211 by rotating the stepping motor 401 in the reverse direction.

In the exemplary structure of FIG. 4, the 4031-4035 are shaped so that the contact surfaces 4031P-4035P contact the one ends of the respective arms 4051-4055 at different timings. Therefore, the rightmost solid model chip stacks 209 start to rise earliest and then the remaining solid model chip stacks 209 start to rise in order (i.e., from right to left). By utilizing this property, owned credit values in such a wide range as 1 to 100,000 credit units can be expressed by projection lengths of the solid model chip stacks 209. For this purpose, for example, the colors or shapes of the solid model chip stacks 209 are varied in such a manner that the value of each chip of the rightmost solid model chip stacks 209 is set lowest and the value of each chip of the pairs of solid model chip stacks 209 increases as the position goes leftward (e.g., the value of each chip of the pairs of solid model chip stacks 209 is set at one credit unit, five credit units, 10 credit units, 100 credit units, and 1,000 credit units in order (i.e., from right to left)).

Figure 5:
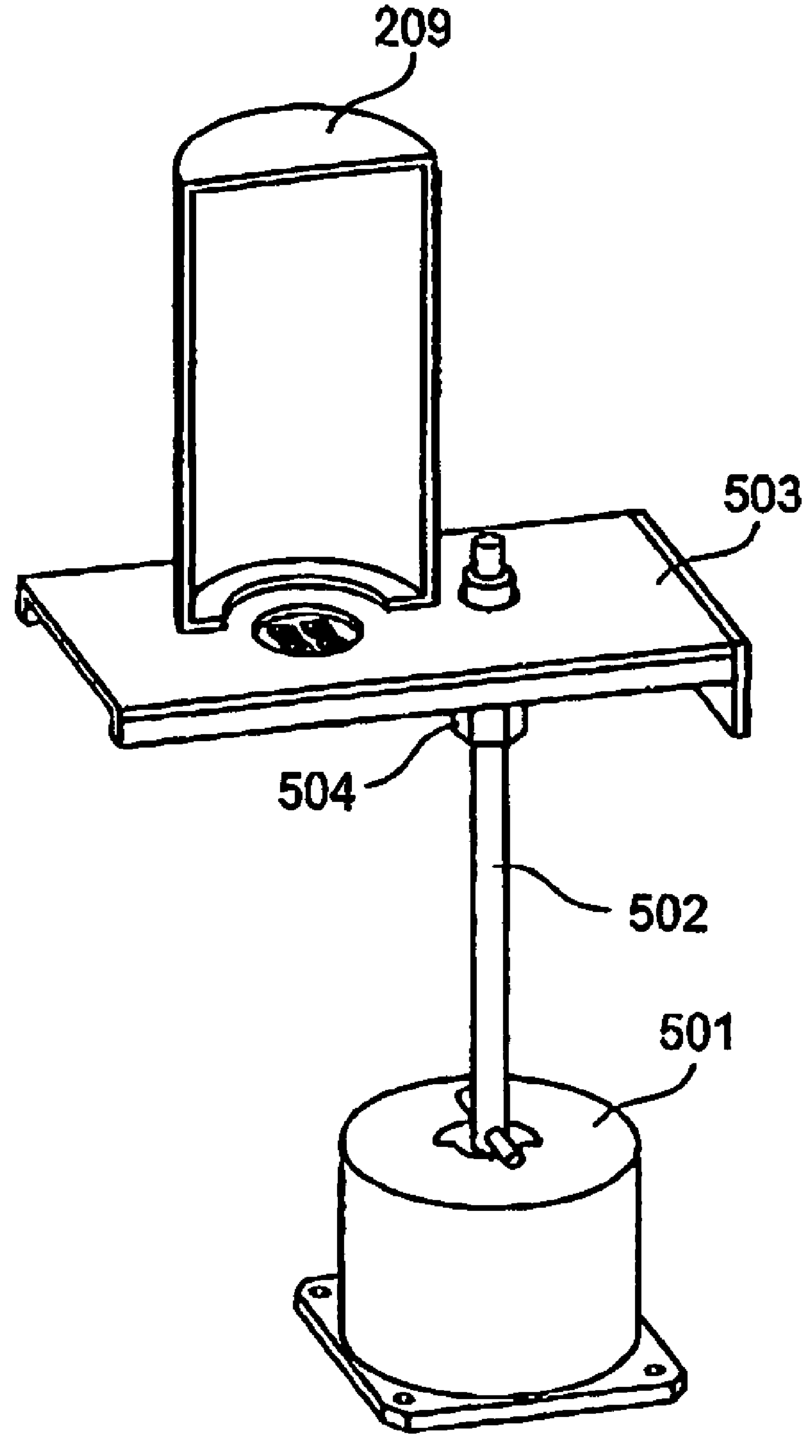
FIG. 5 is a perspective view of a basic unit of another example of the elevation mechanism.
Figure 6:
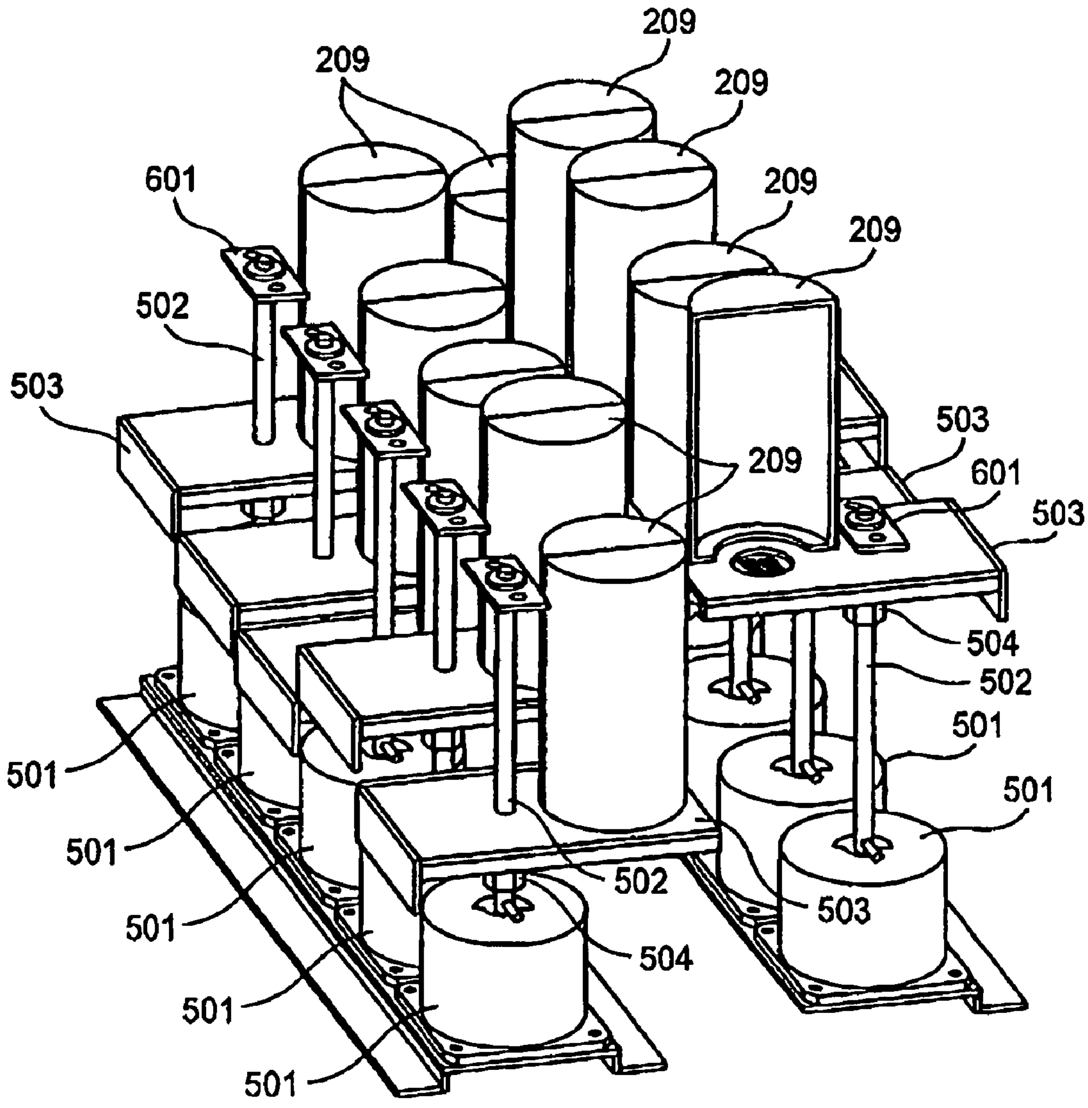
FIG. 6 is a perspective view of the elevation mechanism shown in FIG. 5.

FIGS. 5 and 6 show another exemplary structure of the elevation mechanism 302. FIG. 5 is a perspective view of a basic unit of another exemplary structure of the elevation mechanism 302. One elevation mechanism 302 is formed by plural basic units of FIG. 5.

In the basic unit of the elevation mechanism 302, a table 503 is attached to a rotary drive shaft 502 which is rotationally driven by a stepping motor 501.

As in the above example, a solid model chip stack 209 is mounted on the table 503. In the example of FIG. 5, one solid model chip stack 209 is formed by bonding two (right and left) hollow semicylinders to each other. One hollow semicylinder which has not been bonded to the other yet is shown in FIG. 5. As in the above example, the solid model chip stack 209 is elevated or lowered so as to project or retreat through the opening 210 of the presenting section plate 211 (not shown in FIG. 5).

A nut 504 is fixed to the bottom surface of the table 503. The outer circumferential surface of the rotary drive shaft 502 is formed with a thread ridge and groove (not shown), whereby the nut 504 and the rotary drive shaft 502 are threadedly engaged with each other.

The table 503 is restricted in motion so as not to rotate as the rotary drive shaft 502 is rotated. For example, as in the above example, rotation of the table 503 may be prevented by a guide rail (a vertical movement is not prevented) Alternatively, rotation of the table 503 may be prevented by bringing the table 503 in sliding contact with an inner wall or the like of the gaming machine 100 (a vertical movement is not prevented).

Because of the threaded engagement, the table 503 is advanced or retreated by rotating the rotary drive shaft 502. That is, the elevation/lowering of the table 503 and hence the solid model chip stack 209 mounted thereon can be controlled by controlling the rotational driving by the stepping motor 501.

FIG. 6 is a perspective view of an exemplary elevation mechanism 302 which is formed by plural basic units described above. This elevation mechanism 302 is formed by an array of five basic units each being mounted with one solid model chip stack 209 and another array of five basic units each being mounted with one solid model chip stack 209. Since each basic unit has the stepping motor 501, the solid model chip stacks 209 of the respective basic units can be elevation/lowering-controlled independently of each other.

Therefore, where the elevation mechanism 302 having this structure is used, the elevation/lowering of the solid model chip stacks 209 can be used not only for the indication of an owned credit value but also for other purposes. For example, when the player of the terminal apparatus 101 has had a big win, the elevation mechanism 302 can operate to stage an event that the solid model chip stacks 209 are elevated and lowered so as to be waved from right to left or left to right.

Returning to FIG. 3, the general configuration of the gaming machine 100 will be continued.

Connected to the light source section 303, each player terminal 101 controls the light-emitting operation of the light source section 303. The light source section 303 is a circuit having a light-emitting source such as plural LEDs and functions as a light source capable of switching among different colors (e.g., red, blue, green, and white) and varying the luminance. The light emitted from the light source section 303 is guided by the acrylic panel 207 and output to such a direction as to be seen by a person located outside the gaming machine 100, in particular, the player.

2. Exemplary Configuration of Main Control Section

Figure 7:
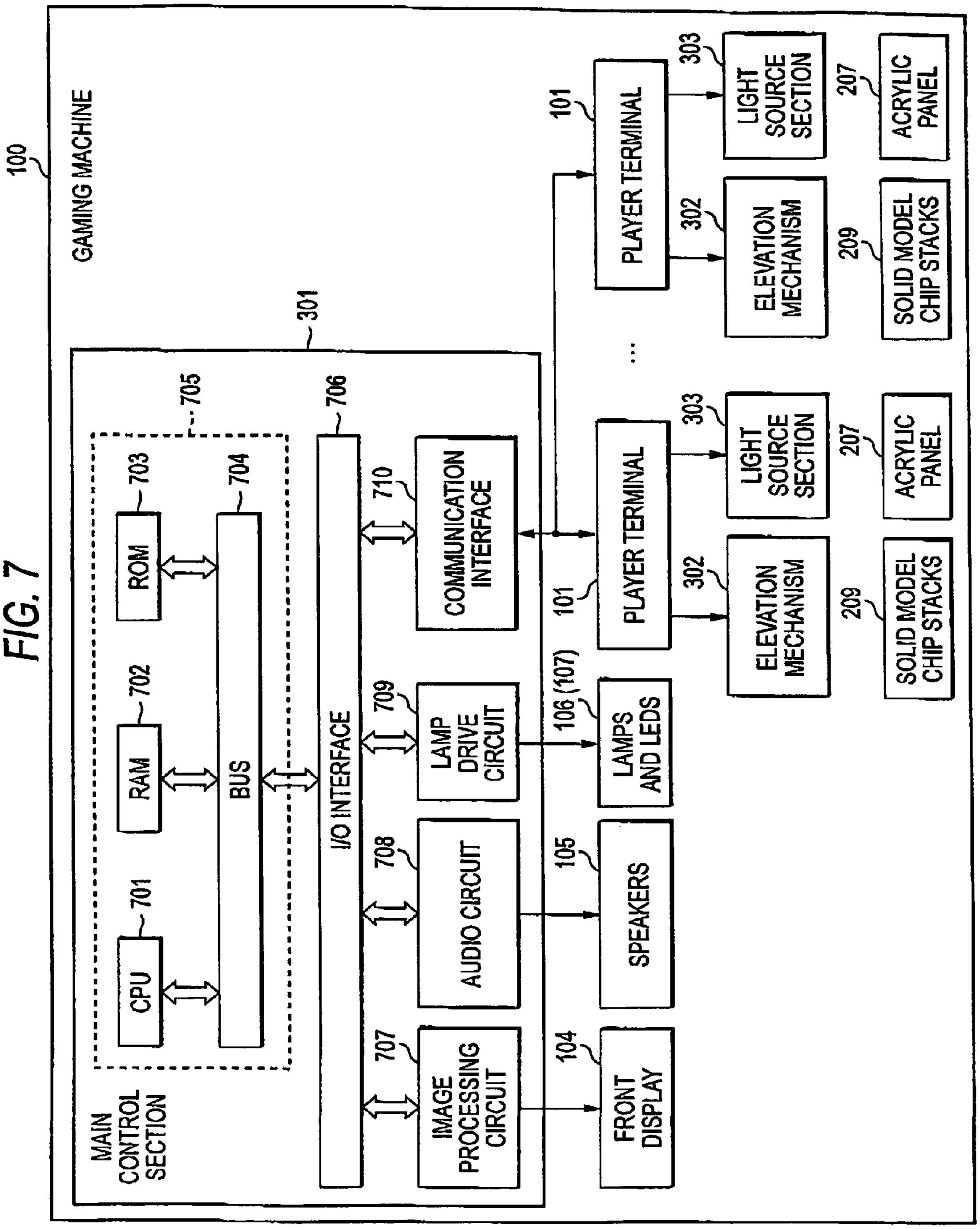
FIG. 7 is a functional block diagram showing an exemplary configuration of a main control section.

Next, an exemplary configuration of the main control section 301 will be described with reference to FIG. 7. FIG. 7 is a block diagram, centered by the main control section 101, of the gaming machine 100.

The main control section 301 is provided with a microcomputer 705 that includes a CPU 701, a RAM 702, a ROM 703, and a bus 704 for data transfer between them. The ROM 703 and the PAM 702 are connected to the CPU 701 via the bus 704. Various programs and data tables that are necessary for performing various kinds of processing to control the gaming machine 100 a restored in the ROM 703. The RAM 703 is a memory for temporarily storing various data produced through computation of the CPU 701.

The microcomputer 705, more specifically, the CPU 701, is connected to an image processing circuit 707 via an I/O interface 706. The image processing circuit 707 is connected to the front display 104 and controls the driving of the front display 104.

The image processing circuit 707 includes a program ROM, an image ROM, an image control CPU, a work RAM, a VDP (video display processor), a video RM, etc. An image control program relating to the display of the front display 104 and various selection tables are stored in the program ROM. Dot data for formation of an image such as dot data to be used in forming an image on the front display 104 are stored in the image ROM. The image control CPU determines an image to be displayed on the front display 104 by selecting from the dot data stored in the image ROM in advance according to parameters set by the CPU 701 and the image control program stored in the program ROM in advance. The work RAM is a temporary storage which is used when the image control CPU runs the image control program. The VDP generates image data for a display content determined by the image control CPU and outputs the generated image data to the front display 104. The video RAM is a temporary storage which is used when the VDP forms an image.

The microcomputer 705, more specifically, the CPU 701, is also connected to the speakers 105 via an audio circuit 708. The speakers 105 generate various sound effects, BGM, etc. on the basis of output signals of the audio circuit 708.

The microcomputer 705, more specifically, the CPU 701, is also connected to the lamps 106 and the LEDs 107 via a lamp drive circuit 709. Large numbers of lamps 106 and LEDs 107 are disposed on the front side of the gaming machine 100, and are lighting-controlled by the lamp drive circuit 709 on the basis of drive signals from the CPU 701 in staging various events.

The microcomputer 705, more specifically, the CPU 701, is further connected to the player terminals 101, whereby a bidirectional communication can be performed between the CPU 701 and each player terminal 101. The CPU 701 can exchange instructions, requests, etc. with each player terminal 101, and the main control section 301 and each player terminal 101 cooperate to perform a game progress control.

3. Exemplary Configuration of Player Terminal

Figure 8:
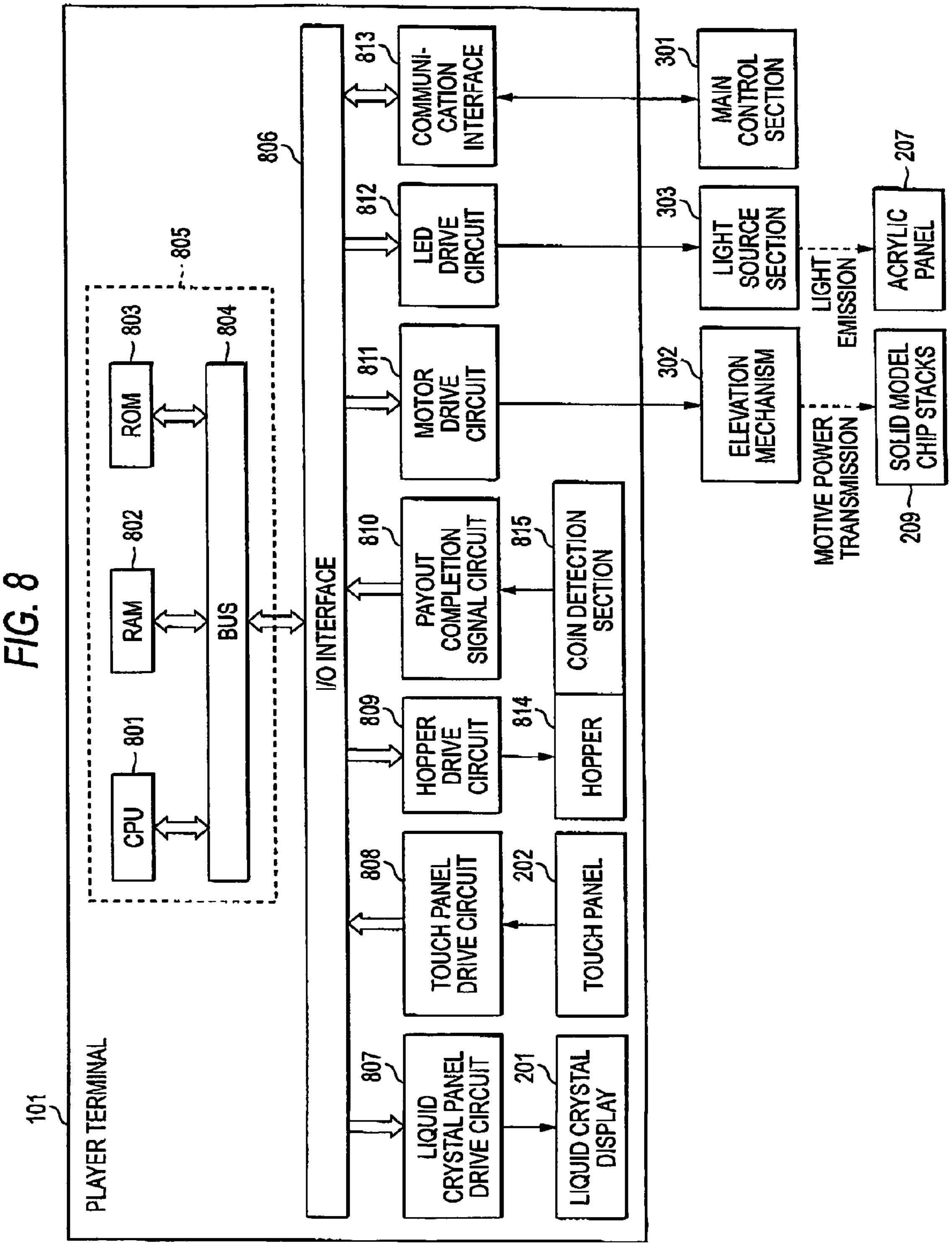
FIG. 8 is a functional block diagram showing an exemplary configuration of the player terminal.

Next, an exemplary configuration of each player terminal 101 will be described with reference to FIG. 8. FIG. 8 is a functional block diagram showing the control system of each player terminal 101.

Each of the player terminals 101 is provided with a microcomputer 805 that includes a CPU 801, a RAM 802, a ROM 803, and a bus 804 for data transfer between them. The ROM 803 and the RAM 802 are connected to the CPU 801 via the bus 804. Various programs and data tables that are necessary for performing various kinds of processing to control the player terminal 101, for example, an operation control on the elevation mechanism 302 and a turning-on/off control on the light source section 303, are stored in the ROM 803. The RAM 803 is a memory for temporarily storing various kinds of data produced through computation of the CPU 801.

The microcomputer 805, more specifically, the CPU 801, is connected to a liquid crystal panel drive circuit 807 via an I/O interface 806. The liquid crystal panel drive circuit 807 is connected to the liquid crystal display 201 and controls the driving of the liquid crystal display 201.

The microcomputer 805, more specifically, the CPU 801, is also connected to a touch panel drive circuit 808 via the I/O interface 806. The touch panel drive circuit 808 outputs coordinate data indicating a contact position on the touch panel 202.

The microcomputer 805, more specifically, the CPU 801, is also connected to a hopper 814 via a hopper drive circuit 809. When a drive signal is supplied from the CPU 801 to the hopper drive circuit 809, the hopper 814 pays out a prescribed number of coins through the coin payout opening 206. A coin detection section 815 is connected to the CPU 801 via a payout completion signal circuit 810. The coin detection section 815 is disposed inside the coin payout opening 206. When detecting that a prescribed number of coins have been paid out through the coin payout opening 206, the coin detection section 815 outputs a coin payout detection signal to the payout completion signal circuit 810. The payout completion signal circuit 810 outputs a payout completion signal to the CPU 801 on the basis of the received coin payout detection signal.

The microcomputer 805, more specifically, the CPU 801, is further connected to a motor drive circuit 811 for rotationally driving the stepping motor 401 (or stepping motors 501) to drive the elevation mechanism 302. A motor drive signal(s) is supplied from the CPU 801 to the motor drive circuit 811, whereby the stepping motor 401 (or stepping motors 501) is rotationally driven by the motor drive circuit 811. As a result, the elevation mechanism 302 operates to elevate or lower the solid model chip stacks 209.

The microcomputer 805, more specifically, the CPU 801, is further connected to an LED drive circuit 812 for driving the light source section 303. In this embodiment, the light source section 303 is composed of plural LEDs and the LED drive circuit 812 supplies, according to drive instructions from the CPU 801, drive power to LEDs as subjects of the drive instructions among all the LEDs. As a result, a turning-on/off control on the LEDs can be performed in desired form under the control of the CPU 801.

In this embodiment, the light source section 303 is composed of five red LEDs, five blue LEDs, and five white LEDs. The LED drive circuit 812 is a circuit capable of supplying power selectively to the set of five red LEDs, the set of five blue LEDs, and the set of five white LEDs so as to turn on/off the sets of LEDs independently.

The microcomputer 805, more specifically, the CPU 801, is still further connected to the main control section 301 via a communication interface 813, whereby a bidirectional communication can be performed between the CPU 801 and the main control section 301. The CPU 801 can exchange instructions, requests, data, etc. with the main control section 301, and the main control section 301 and the player terminal 101 cooperate to perform a game progress control.

Figure 9:
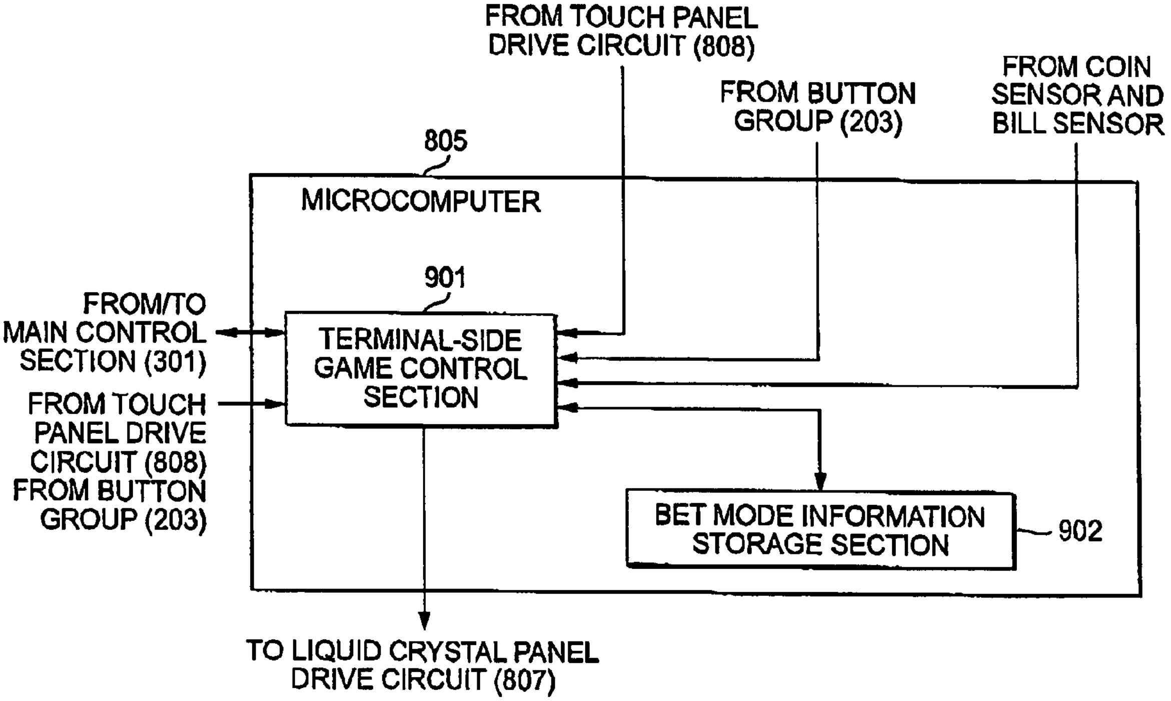
FIG. 9 is a functional block diagram of a microcomputer provided in the player terminal.

FIG. 9 is a block diagram for description of the functions of the microcomputer 805 of each player terminal 101 and is a functional block diagram mainly relating to display processing.

The microcomputer 805 has a terminal-side game control section 901 corresponding to a controller and a bet mode information storage section 902 corresponding to a storage.

The terminal-side game control section 901 receives a bet mode selection input or a bet mode switching input, a bet subject selection input, an input relating to specification of a bet amount, etc. from the player via the touch panel drive circuit 808 and the button group 203. The terminal-side game control section 901 informs the main control section 301 of the received inputs of the player.

Pieces of bet mode information corresponding to plural bet modes employed in the gaming machine 100, respectively, are stored in the bet mode information storage section 902. The bet mode information is information including bet subjects that can be selected by the player in the associated bet mode, bet factors that are set for the respective bet subjects, lower limit and upper limit bet amounts that are prescribed for the associated bet mode. In this embodiment, it is assumed that the gaming machine 100 can provide a game in two bet modes, that is, a normal bet mode as a first bet mode and a score bet mode as a second bet mode.

The normal bet mode is a mode in which a betting method of the traditional game is employed. In the normal bet mode, three bet subjects "tie," "player," and "banker" are available for which the bet factors are set at "9," "1.95," and "2," respectively. The lower limit and upper limit bet amounts are set at "1" and "1,000," respectively.

The score bet mode is a mode in which the player may be able to acquire a larger award than in the normal bet mode. In the score bet mode, nine bet subjects are available, that is, each of the three bet subjects "tie," "player," and "banker" is classified into three kinds by the score (the larger one of the sum of the numbers on cards dealt to the player and the sum of the numbers on cards dealt to the banker; either of those sums if they are identical). The bet factors of the respective bet subjects are determined in accordance with their probabilities of occurrence, and the maximum value of those bet factors is set larger than that of the bet factors of the normal bet mode. Lower limit and upper limit bet amounts are also set in the bet mode information of the score bet mode. However, the lower limit bet amount is set smaller than that of the normal bet mode. The gaming machine 100 may be configured so as to provide three or more bet modes.

FIGS. 10A and 10B show exemplary data structures of pieces of bet mode information stored in the bet mode information storage section 902. FIGS. 10A and 10B show bet mode information of the normal bet mode and bet mode information of the score bet mode, respectively.

The terminal-side game control section 901 reads one of the pieces of bet mode information from the bet mode information storage section 902 according to a bet mode selection input or a bet mode switching input of the player, and drives the liquid crystal panel drive circuit 807 so as to display a bet screen on the liquid crystal display 201 according to the read-out bet mode information. The terminal-side game control section 901 judges whether a bet amount that is input through the bet screen falls within the range defined by the lower limit and upper limit bet amounts of the bet mode. If the input bet amount is out of the range, the terminal-side game control section 901 prompts the player to correct the bet amount. If the player has input a bet amount that falls within the range and has selected one of the bet subjects, the terminal-side game control section 901 informs the main control section 301 of the bet amount, the bet subject, and the bet factor that is set for the bet subject.

The main control section 301 advances a game, and determines game results ("tie," "player," or "banker") and scores and determines whether the players of the respective player terminals 101 have won or lost the game. The main control section 301 informs the player terminals 101 (i.e., terminal-side game control sections 901) of the win/loss results.

Informed of the win/loss result, each player terminal 101 (i.e., terminal-side game control section 901) pays out an award or collects the bet amount depending on the informed win/loss result and finishes the game.

According to the gaming machine 100 having the above configuration, in the score bet mode in which the number of bet subjects is larger than in the normal bet mode, the bet factors can be get larger than in the normal bet mode. Therefore, each player may be able to acquire a larger award in one game, which would increase the motivation of each player to play games.

In the score bet mode in which the bet factors are set large, the payout rate can be suppressed by setting the lower limit bet amount smaller than in the normal bet mode, which prevents the store side (gaming machine operator side) from suffering a heavy loss.

4. Examples of Screens

Next, examples of screens used in the gaming machine 100 will be described.

4.1 Exemplary Bet Screen in Normal Bet Mode

Figure 11:
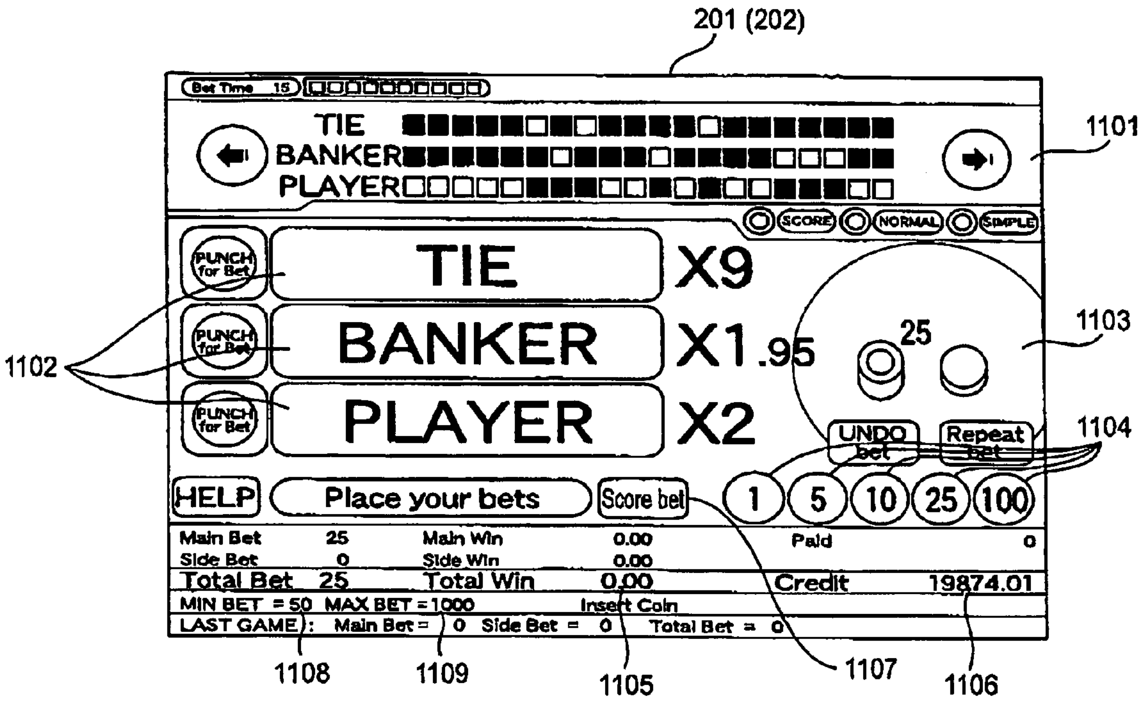
FIG. 11 shows an exemplary bet screen which is displayed on a liquid crystal display of each player terminal in an normal bet mode.

FIG. 11 shows an exemplary bet screen which is displayed on the liquid crystal display 201 of each player terminal 101 in the normal bet mode. The bet screen serves as an input interface which prompts the player to bet. The player performs various manipulations for advancing a game using the bet screen of FIG. 11 as an input interface, that is, by touching the touch panel 202 which is mounted on the front surface of the liquid crystal display 201.

A game result table region 1101, which occupies a top portion of the screen, is a region for displaying past game results ("tie," "banker," or "player"). Looking at the contents of the region 1101, the player can predict a result of the next game.

Area buttons 1102 corresponding to the three respective bet subjects "tie," "banker," or "player" are displayed on the bottom-left of the game result region 1101. The player can select and input a bet subject by touching one of the three area buttons 1102.

Bet factors are displayed on the right of the respective area buttons 1102. If a game result coincides with a bet subject selected by the player, that is, if the player wins a game, the player acquires a credit value that is a game medium (the number of coins) bet by the player multiplied by the bet factor.

A chip display region 1103 is provided on the right of the bet factors. An image of chips corresponding to a game medium (the number of coins) bet by the player is displayed in the chip display region 1103 to cause the player to feel as if the player were playing an actual game.

Plural bet buttons 1104 are displayed under the chip display region 1103. The player can input a desired bet value by touching the bet buttons 1104 as appropriate. In this exemplary screen, values "1," "5," "10," "25," and "100" are set for the respective bet buttons 1104. When the player touches one of the bet buttons 1104, a game medium (the number of coins) corresponding to the value set for the touched bet button 1104 is added to the bet value.

An acquired credit value display region 1105 and an owned credit value display region 1106 are provided below the bet buttons 1104.

A score bet button 1107 for switching the bet mode to the score bet mode is displayed on the left of the bet buttons 1104. If the player touches the score bet button 1107, the bet screen is switched to a screen corresponding to the score bet mode.

A lower limit bet amount display region 1108 and an upper limit bet amount display region 1109 of the current bet mode are provided on the bottom-left of the score bet button 1107. A lower limit bet amount and an upper limit bet amount are displayed in the regions 1108 and 1109 to lead the player to determine a bet amount within the range defined by those amounts.

Next, an exemplary bet input method in the normal bet mode will be described with reference to FIGS. 12A-13B.

Figure 12A:
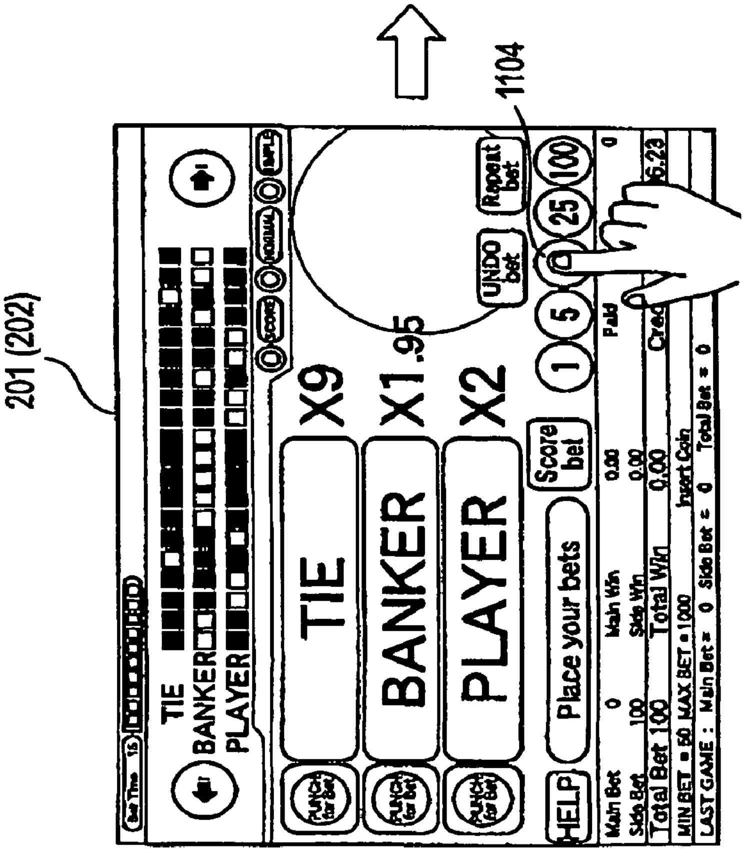
FIG. 12A shows an exemplary bet screen which is displayed on the liquid crystal display of each player terminal.

FIG. 12A shows a state that the player is touching a bet button 1104 to determine a bet amount after the bet screen of FIG. 11 has been displayed.

Figure 12B:
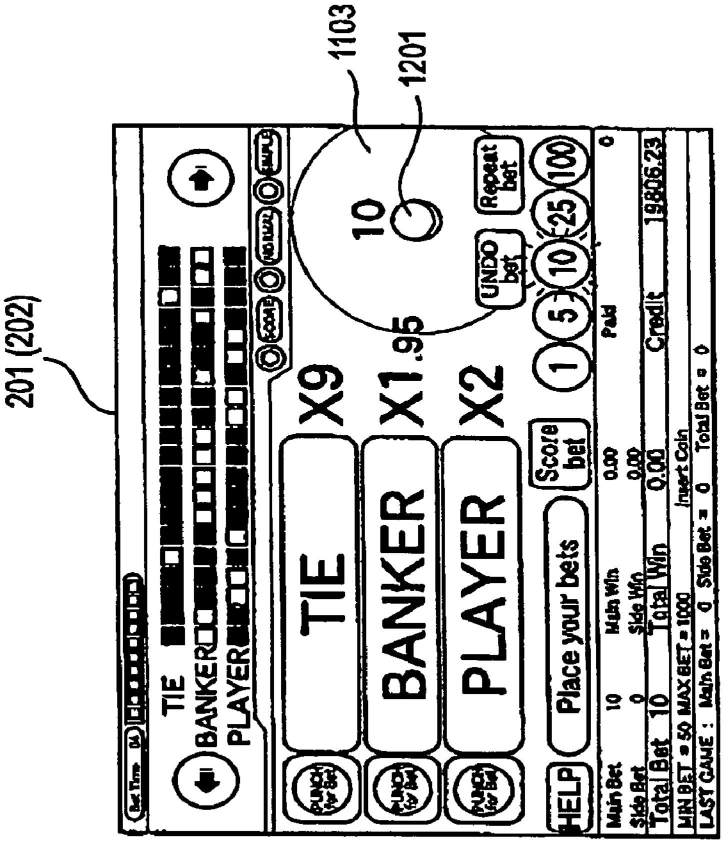
FIG. 12B shows an exemplary bet screen to be displayed after the bet screen of FIG. 12A.

FIG. 12B shows an exemplary bet screen as a destination of a transition from the screen of FIG. 12A. A chip image 1201 corresponding to the bet amount of the bet button 1104 touched by the player is displayed in the chip display region 1103 to allow the player to recognize the bet amount.

Figure 13B:
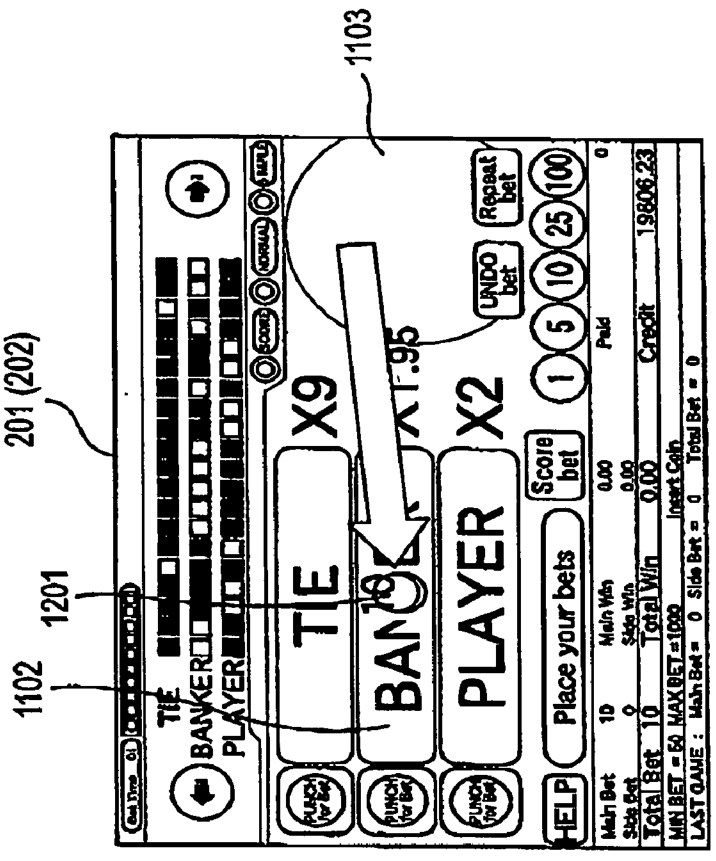
FIG. 13B shows an exemplary bet screen to be displayed after the bet screen of FIG. 13A.
Figure 13A:
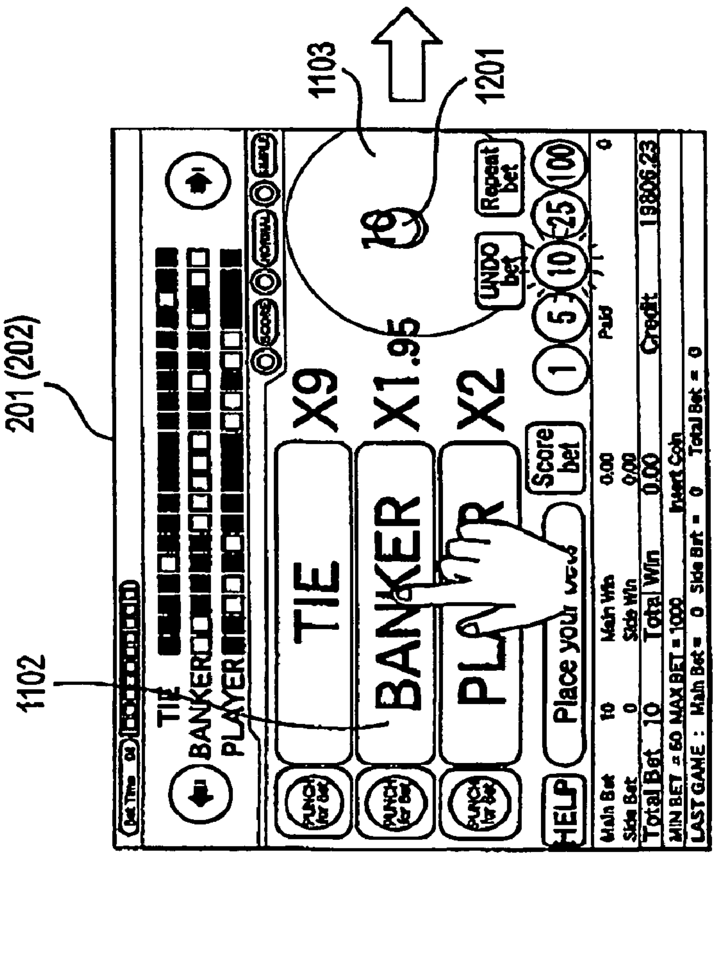
FIG. 13A shows an exemplary bet screen to be displayed after the bet screen of FIG. 12B.

FIG. 13A shows a state that the player is touching an area button 1102 to determine a bet subject after the bet screen of FIG. 12B has been displayed.

FIG. 13B shows an exemplary bet screen as a destination of a transition from the screen of FIG. 13A. In this screen, a display is made so as to indicate a movement of the chip image 1201 from the chip display region 1103 to the area button 1102 touched by the player, to allow the player to recognize the bet subject.

The bet input in the normal bet mode is thus completed. Then, the main control section 301 determines a game result and informs each player terminal 101 of it, whereupon switching is made to a game result notification screen (not shown) and each player is informed that an award will be paid or the bet amount will be collected.

4.2 Switching from Normal Bet Mode to Score Bet Mode

Next, how switching is made from the normal bet mode to the score bet mode will be described with reference to FIGS. 14A and 148.

Figure 14B:
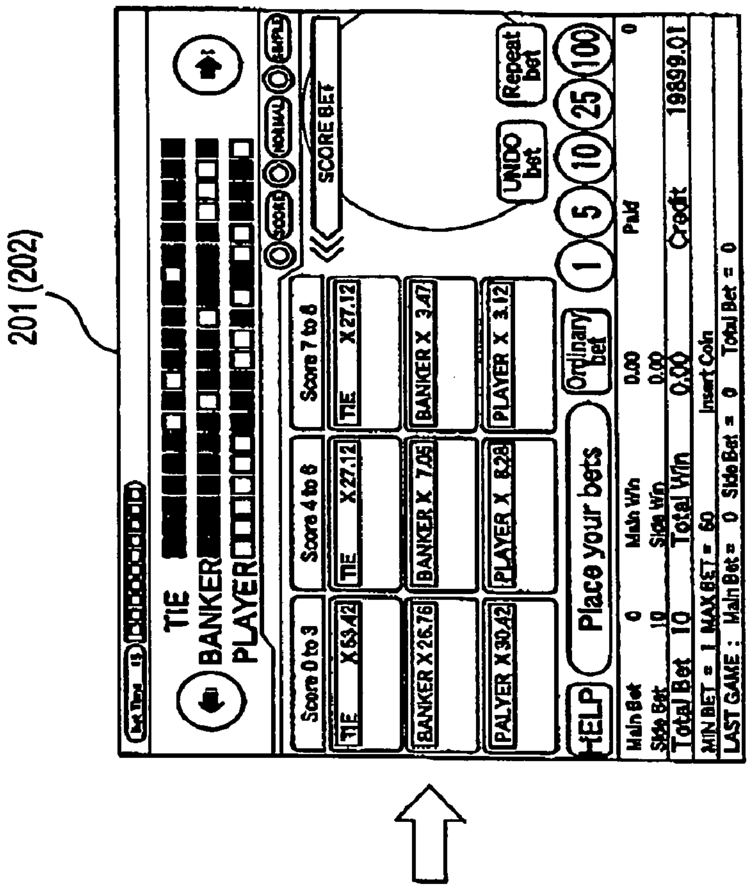
FIG. 14B shows an exemplary bet screen of a score bet mode as a destination of a transition from the bet screen of FIG. 14A.
Figure 14A:
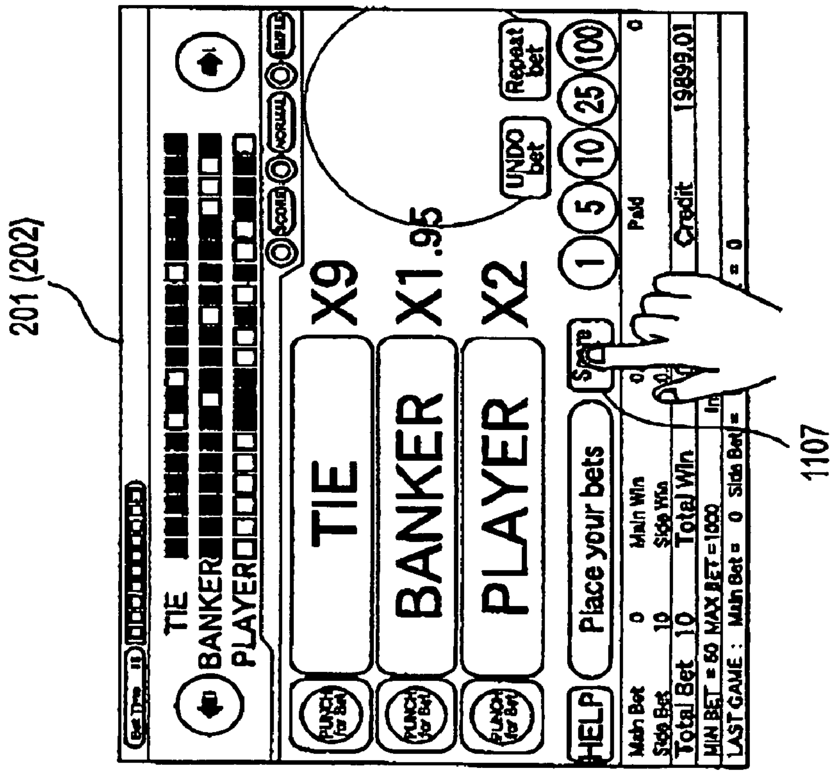
FIG. 14A shows an exemplary bet screen in which a score bet button is being touched.

FIG. 14A shows a state that the player is touching the score bet button 1107 in the bet screen of the normal bet mode to cause switching to the score bet mode. Detecting the touch of the score bet button 1107 via the touch panel 202, the terminal-side game control section 901 causes a transition to the score bet mode.

Upon the transition to the score bet mode, a bet screen of the score bet mode is displayed on the liquid crystal display 201. FIG. 14B shows an exemplary bet screen of the score bet mode as a destination of a transition from the bet screen of FIG. 14A.

4.3 Exemplary Bet Screen in Score Bet Mode

Figure 15:
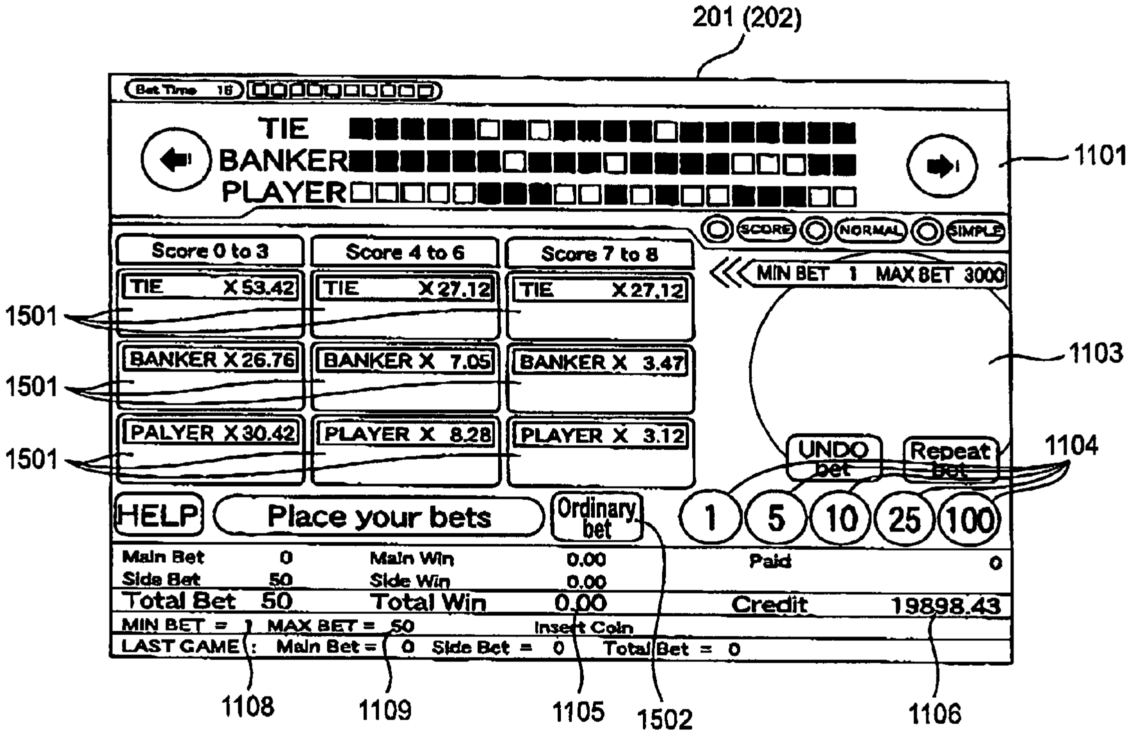
FIG. 15 shows an exemplary bet screen which is displayed in the score bet mode.

FIG. 15 shows an exemplary bet screen of the score bet mode, which is the same as the exemplary bet screen of the normal bet mode shown in FIG. 11 except that nine area buttons 1501 are substituted for the three area buttons 1102 and an ordinary bet button 1502 is substituted for the score bet button 1107. Therefore, components in FIG. 15 having the same components in FIG. 11 will be given the same reference numerals as the latter and will not be described.

Bet factors are displayed in the respective area buttons 1501. When the player touches the ordinary bet button 1502, switching is made from the score bet mode to the normal bet mode and a transition is made to the bet screen of FIG. 11.

Next, an exemplary bet input method in the score bet mode will be described with reference to FIGS. 16A and 16S.

Figure 16B:
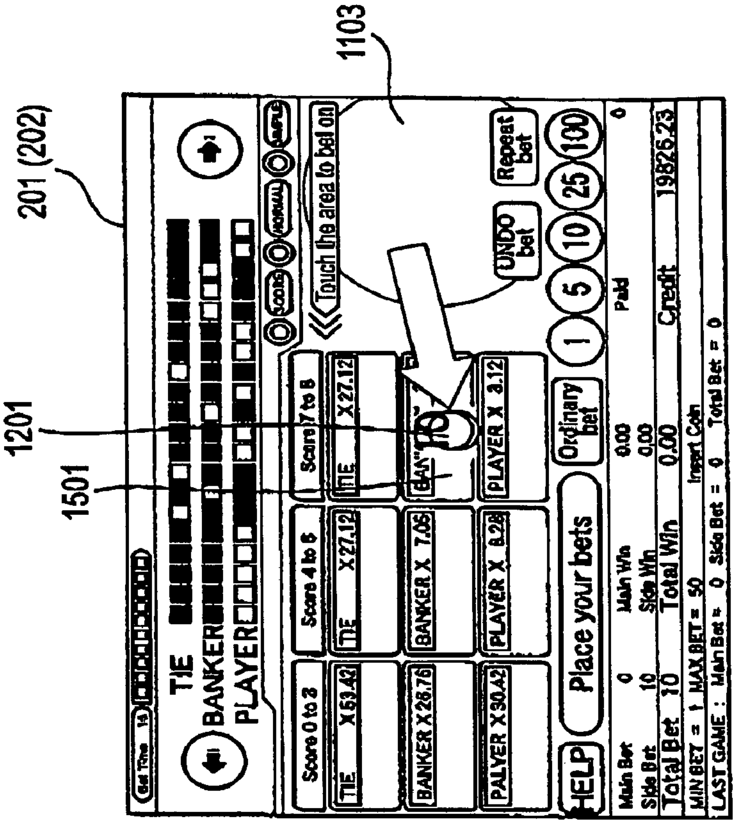
FIG. 16B shows an exemplary bet screen as a destination of a transition from the bet screen of FIG. 16A.
Figure 16A:
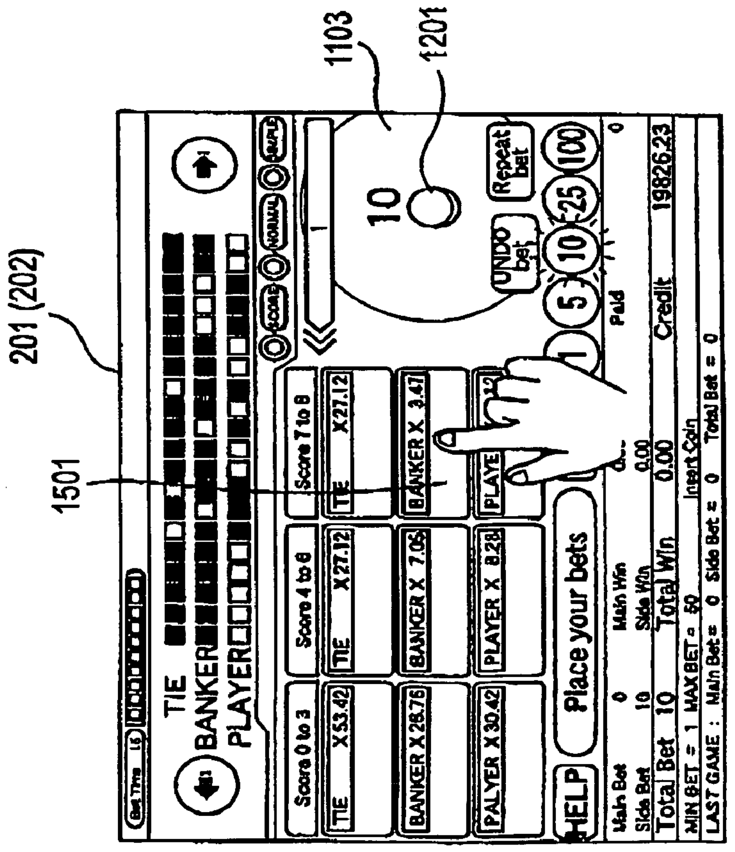
FIG. 16A shows an exemplary bet screen in which an area button is being touched.

FIG. 16A shows a state that the player is touching an area button 1501 to determine a bet subject after making an input of determining a bet amount in the same manner as in the normal bet mode.

FIG. 16B shows an exemplary bet screen as a destination of a transition from the screen of FIG. 16A. In this screen, a display is made so as to indicate a movement of the chip image 1201 from the chip display region 1103 to the area button 1501 touched by the player, to allow the player to recognize the bet subject.

The bet input in the score bet mode is thus completed. Then, the main control section 301 determines a game result and informs each player terminal 101 of it, whereupon switching is made to a game result notification screen (not shown) and each player is informed that an award will be paid or the bet amount will be collected.

Figure 17A:
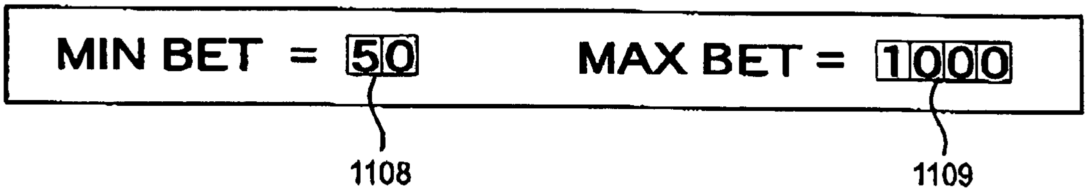
FIG. 17A is an enlarged view of a lower limit bet amount display region and an upper limit bet amount display region in the normal bet mode.
Figure 17B:
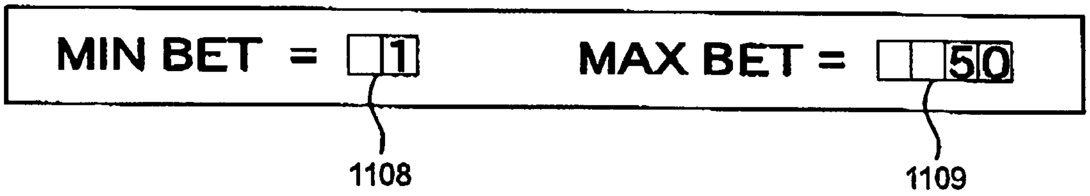
FIG. 17B is an enlarged view of a lower limit bet amount display region and an upper limit bet amount display region in the score bet mode.

Since the lower limit bet amount and the upper limit bet amount of the normal bet mode are different from those of the score bet mode, the values displayed in the lower limit bet amount display region 1108 and the upper limit bet amount display region 1109 in the normal bet mode are different from those in the score bet mode. FIG. 17A is an enlarged view of the lower limit bet amount display region 1108 and the upper limit bet amount display region 1109 in the normal bet mode, and FIG. 17B is an enlarged view of the lower limit bet amount display region 1108 and the upper limit bet amount display region 1109 in the score bet mode.

4.4 Screen for Switching of Lower Limit Bet Amount and Upper Limit Bet Amount

Figure 18:
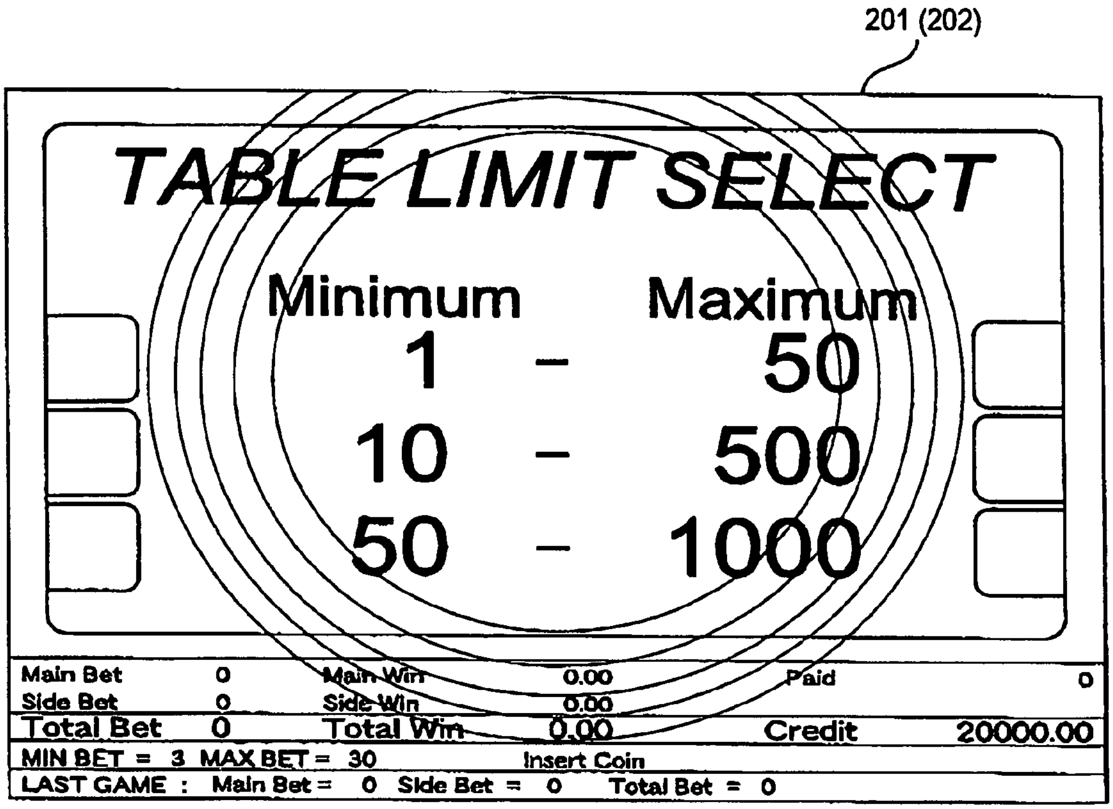
FIG. 18 shows an exemplary input interface screen to be used for changing the lower limit bet amount and the upper limit bet amount.

The gaming machine 100 may be configured in such a manner that the lower limit bet amount and the upper limit bet amount can be changed by each player in the normal bet mode. FIG. 18 shows an exemplary input interface screen to be used for changing the lower limit bet amount and the upper limit bet amount. In this example, three combinations of a lower limit bet amount and an upper limit bet amount are presented and the player can select one of those combinations. After the selection, a bet amount can be input in the range defined by the selected lower limit bet amount and the upper limit bet amount. As a larger upper limit bet amount is selected, the lower limit bet amount becomes larger, which enables maneuvering that fits the playing style of each player.

The gaming machine 100 may be configured so as to set an upper limit bet value in the score bet mode on the basis of the maximum number of payout coins, that is, the upper limit bet amount and the corresponding bet factor, of the normal bet mode. This configuration makes it possible to operate the gaming machine 100 while the payout rate is kept within a prescribed range even if the lower limit bet amount and the upper limit bet amount are switched.

4.5 Switching of Game Result Table

Figure 19A:
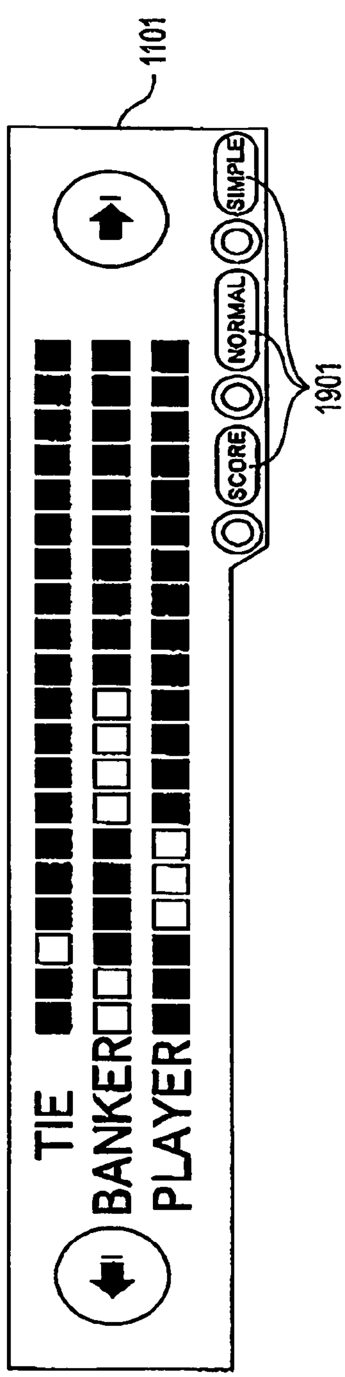
FIG. 19A shows an exemplary game result table which is called "simple.
Figure 19B:
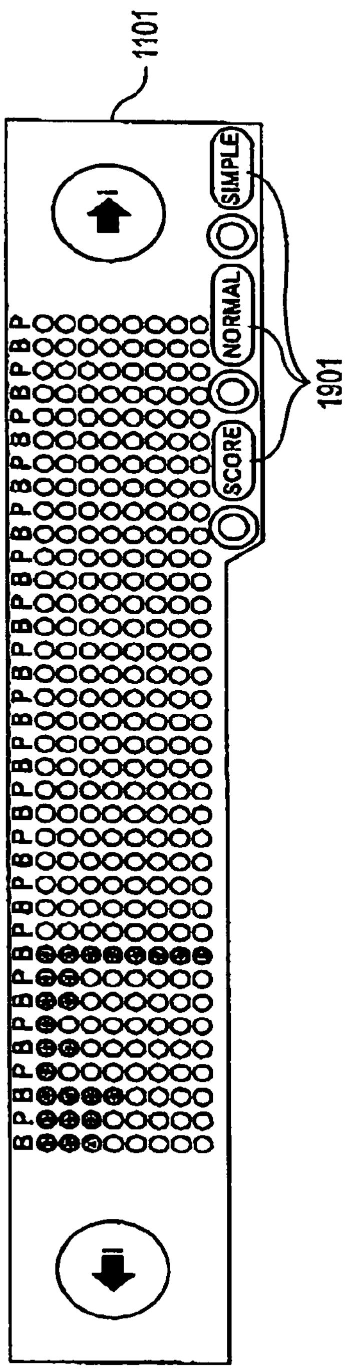
" FIG. 19B shows an exemplary game result table which is called "normal.
Figure 19C:
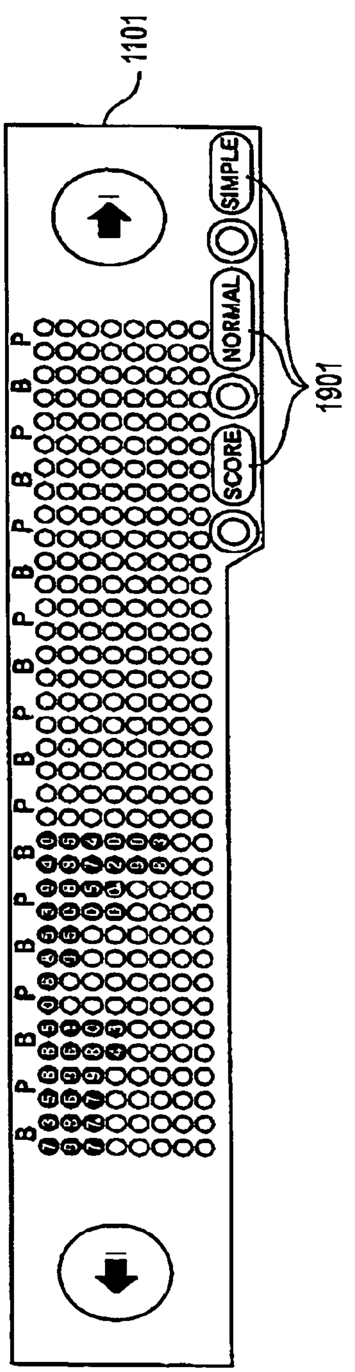
" and FIG. 19C shows an exemplary game result table which is called "score."

The gaming machine 100 may be configured in such a manner that the game result table displayed in the game result table region 1101 can be switched to one suitable for the score bet mode. FIGS. 19A-19C show exemplary game result tables.

FIG. 19A shows an exemplary game result table called "simple," which it indicates winner sides but does not include information relating to scores. This game result table is suitable for the normal bet mode but the information contained therein is insufficient for the score bet mode.

FIG. 19B shows an exemplary game result table called "normal," which allows each player to recognize how the two sides have won consecutively and hence is suitable to check win/loss fluctuations. Columns of "banker" and "player" are arranged alternately, and the number of marks shaped in circle shown under "B" or " " means the number of consecutive wins. When the winner side is changed, the column in which to arrange marks shaped in circle is switched to the adjacent one. Mark shaped in triangle is displayed when a tie occurs. This game result table is suitable for the normal bet mode but the information contained therein is insufficient for the score bet mode.

FIG. 19C shows an exemplary game result table called "score," which allows each player to recognize even scores and hence is useful in determining a bet subject in the score bet mode. This game result table is basically the same as the game result table "normal" except that numerical values indicating scores are displayed instead of marks shaped in circle.

Switching between the above game result tables can be made by touching one of game result table buttons 1901.

As described with reference to the embodiment, there is provided a gaming machine including: a storage (e.g., a microcomputer or a bet mode information storage section) in which first bet mode information corresponding to a first bet mode (e.g., normal bet mode) and second bet mode information corresponding to a second bet mode (e.g., score bet mode) are stored; and controller (e.g., the microcomputer or a terminal-side game control section) for running a game on the basis of one, selected by a player, of the first bet mode information and the second bet mode information. The gaming machine is configured that each of the first bet mode information and the second bet mode information is information including a plurality of bet subjects, bet factors for the respective bet subjects, a lower limit bet amount, and an upper limit bet amount; that the lower limit bet amount of the first bet mode information is larger than that of the second bet mode information; and that a maximum value of the bet factors of the first bet mode information is smaller than a maximum value of the bet factors of the second bet mode information.

The gaming machine allows a player to play a game in the second bet mode in which the player may be able to acquire a large game medium in one game than in the first bet mode. On the other hand, since the lower limit bet amount and the maximum value of the bet factors of the first bet mode and those of the second bet mode are set so as to be correlated with each other, the probability of an unduly large payment can be lowered while the payout rate in the second bet mode is controlled and the probability that a player is given a large award is thereby kept at a certain level.

In the gaming machine, the upper limit bet amount of the second bet mode information may be determined on the basis of a maximum number of payout game medium media that is a product of the upper limit bet amount of the first bet mode information and the maximum value of the bet factors of the first bet mode information.

The gaming machine makes it possible to restrict the number of game medium media paid out by the gaming machine within a predictable range even if the bet factors of the second bet mode are set large.

According to the gaming machine, it becomes possible to control the payout rate while giving a player a possibility of acquiring a large award.

The foregoing description of the embodiment has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable those skilled in the art to utilize the invention in various embodiments and with various modifications as are suited to the particular use contemplated. It is intended that the scope of the invention be defined by the claims appended hereto, and their equivalents.

What is claimed is:

1. A gaming machine, comprising:

a controller that performs a game processing for providing a game of baccarat to a player, the game being performed by allowing the player to bet a game medium to a bet subject in one of game modes being selected in accordance with a selection made by the player, the game modes having a first bet mode and a second bet mode, said first bet mode and said second bet mode being displayed to said player in the alternative, as based on selections by the player;

a storage unit that stores first bet mode information that is used by the controller in performing the game in the first bet mode, and second bet mode information that is used by the controller in performing the game in the second bet mode; and a display that is provided with a touch panel, wherein each of the first bet mode information and the second bet mode information includes information for specifying a plurality of bet subjects on which the player is allowed to bet, a plurality of bet factors for the respective bet subjects, the bet factors set to be multiplied with the game medium bet on the respective bet subjects when the player wins the game, and a lower limit bet amount and an upper limit bet amount that regulates an amount of game medium allowed to bet in the game, the first bet mode providing three bet subjects of "Tie", "Player", and "Banker", and the second bet mode allowing the player to bet on a combination of one of the three bet subjects and in which of a score range the player would win, said score ranges comprising 0 to 3, 4 to 6, and 7 to 9, for each of "Tie", "Player", and "Banker", wherein the lower limit bet amount of the first bet mode information is set to be larger than the lower limit bet amount of the second bet mode information, wherein a maximum value of the bet factors of the first bet mode information is set to be smaller than a maximum value of the bet factors of the second bet mode information, wherein the display is configured to display either one of a first bet screen and a second bet screen, the first bet screen being displayed in the first game mode and the second bet screen being displayed in the second game mode, wherein three area buttons are displayed on the first bet screen, the three area buttons corresponding to the three respective bet subjects of "Tie", "Player", and "Banker", wherein a first selection button for switching the game mode from the first game mode to the second game mode is displayed on the first bet screen, wherein nine bet subjects are available in the second game mode, wherein nine area buttons are displayed on the second bet screen, the nine area buttons corresponding to the nine respective bet subjects, and wherein a second selection button for switching the game mode from the second game mode to the first game mode is displayed on the second bet screen.

2. The gaming machine of claim 1, wherein the first betting mode comprises a traditional betting mode for baccarat and the second betting mode provides a mechanism for a player to secure a larger award than in the traditional betting mode.

3. The gaming machine of claim 1, wherein said lower limit bet amount is respectively displayed in each of said first bet mode display and said second bet mode display.

4. The gaming machine of claim 1, further comprising an input screen providing a player to change, in said first bet mode, one of the lower limit bet amount and the upper limit bet amount, wherein a change in one of said lower limit bet amount and said upper limit bet amount automatically causes a change in the other bet amount.

5. The gaming machine of claim 1, wherein the upper limit bet amount is automatically set on a basis of a maximum number of payout coins.

6. A method of enhancing a motivation of a player of baccarat on a gaming machine, while maintaining a control of a payout rate, said method comprising:

performing a game processing for providing the game of baccarat to a player, the game being performed by allowing the player to bet a game medium to a bet subject in one of game modes being selected in accordance with a selection made by the player, the game modes having a first bet mode and a second bet mode, said first bet mode and said second bet mode being displayed to said player in the alternative, as based on selections by the player;

storing first bet mode information that is used by a controller in performing the game in the first bet mode, and second bet mode information that is used by the controller in performing the game in the second bet mode; and displaying either one of a first bet screen and a second bet screen, the first bet screen being displayed in the first game mode and the second bet screen being displayed in the second game mode;

wherein each of the first bet mode information and the second bet mode information includes information for specifying a plurality of bet subjects on which the player is allowed to bet, a plurality of bet factors for the respective bet subjects, the bet factors set to be multiplied with the game medium bet on the respective bet subjects when the player wins the game, and a lower limit bet amount and an upper limit bet amount that regulates an amount of game medium allowed to bet in the game, the first bet mode providing three bet subjects of "Tie", "Player", and "Banker", and the second bet mode allowing the player to bet on a combination of one of the three bet subjects and in which of a score range the player would win, said score ranges comprising 0 to 3, 4 to 6, and 7 to 9, for each of "Tie", "Player", and "Banker", wherein the lower limit bet amount of the first bet mode information is set to be larger than the lower limit bet amount of the second bet mode information, wherein a maximum value of the bet factors of the first bet mode information is set to be smaller than a maximum value of the bet factors of the second bet mode information, wherein three area buttons are displayed on the first bet screen, the three area buttons corresponding to the three respective bet subjects of "Tie", "Player", and "Banker", wherein a first selection button for switching the game mode from the first game mode to the second game mode is displayed on the first bet screen, wherein nine bet subjects are available in the second game mode, wherein nine area buttons are displayed on the second bet screen, the nine area buttons corresponding to the nine respective bet subjects, and wherein a second selection button for switching the game mode from the second game mode to the first game mode is displayed on the second bet screen.

7. The method of claim 6, wherein said lower limit bet amount is respectively displayed in each of said first bet mode display and said second bet mode display.

8. The method of claim 6, further comprising an input screen providing a player to change, in said first bet mode, one of the lower limit bet amount and the upper limit bet amount, wherein a change in one of said lower limit bet amount and said upper limit bet amount automatically causes a change in the other bet amount.

9. The method of claim 6, wherein the upper limit bet amount is automatically set on a basis of a maximum number of payout coins.

10. A non-transitory computer-readable storage medium storing computer instructions for configuring a computer to perform steps comprising:

performing a game processing for providing the game of baccarat to a player, the game being performed by allowing the player to bet a game medium to a bet subject in one of game modes being selected in accordance with a selection made by the player, the game modes having a first bet mode and a second bet mode, said first bet mode and said second bet mode being displayed to said player in the alternative, as based on selections by the player;

storing first bet mode information that is used by a controller in performing the game in the first bet mode, and second bet mode information that is used by the controller in performing the game in the second bet mode; and displaying either one of a first bet screen or a second bet screen, the first bet screen being displayed in the first game mode and the second bet screen being displayed in the second game mode, wherein each of the first bet mode information and the second bet mode information includes information for specifying a plurality of bet subjects on which the player is allowed to bet, a plurality of bet factors for the respective bet subjects, the bet factors set to be multiplied with the game medium bet on the respective bet subjects when the player wins the game, and a lower limit bet amount and an upper limit bet amount that regulates an amount of game medium allowed to bet in the game, the first bet mode providing three bet subjects of "Tie", "Player", and "Banker", and the second bet mode allowing the player to bet on a combination of one of the three bet subjects and in which of a score range the player would win, said score ranges comprising 0 to 3, 4 to 6, and 7 to 9, for each of "Tie", "Player", and "Banker", wherein the lower limit bet amount of the first bet mode information is set to be larger than the lower limit bet amount of the second bet mode information, wherein a maximum value of the bet factors of the first bet mode information is set to be smaller than a maximum value of the bet factors of the second bet mode information, wherein three area buttons are displayed on the first bet screen, the three area buttons corresponding to the three bet subjects of "Tie", "Player", and "Banker", wherein a first selection button for switching the game mode from the first game mode to the second game mode is displayed on the first bet screen, wherein nine bet subjects are available in the second game mode, wherein nine area buttons are displayed on the second bet screen, the nine area buttons corresponding to the nine bet subjects, and wherein a second selection button for switching the game mode from the second game mode to the first game mode is displayed on the second bet screen.

11. The storage medium of claim 10, wherein said lower limit bet amount is respectively displayed in each of said first bet mode display and said second bet mode display.

12. The storage medium of claim 10, further comprising an input screen providing a player to change, in said first bet mode, one of the lower limit bet amount and the upper limit bet amount, wherein a change in one of said lower limit bet amount and said upper limit bet amount automatically causes a change in the other bet amount.

13. The storage medium of claim 10, wherein the upper limit bet amount is automatically set on a basis of a maximum number of payout coins.

* * * * *